United States Patent
Cabrera et al.

(10) Patent No.: US 8,125,849 B2
(45) Date of Patent: Feb. 28, 2012

(54) INTEGRATED MULTI-BEAM ACOUSTIC DOPPLER DISCHARGE MEASUREMENT SYSTEM

(75) Inventors: Ramon Cabrera, Miami, FL (US); John Sloat, Las Vegas, NV (US); Steve Maier, Poway, CA (US); Matthew J. Hull, San Diego, CA (US)

(73) Assignee: YSI Incorporated, Yellow Springs, OH (US)

(*) Notice: Subject to any disclaimer, the term of this patent is extended or adjusted under 35 U.S.C. 154(b) by 549 days.

(21) Appl. No.: 12/340,315

(22) Filed: Dec. 19, 2008

(65) Prior Publication Data

US 2010/0154561 A1    Jun. 24, 2010

(51) Int. Cl.
*G01S 15/00* (2006.01)
*G01F 1/20* (2006.01)
*G01F 1/58* (2006.01)

(52) U.S. Cl. ........... 367/90; 367/87; 367/89; 73/861.18; 73/861.25; 73/204.11

(58) Field of Classification Search .................... 367/87, 367/89, 90; 73/861.18, 861.25, 204.11
See application file for complete search history.

(56) References Cited

U.S. PATENT DOCUMENTS

| | | | |
|---|---|---|---|
| 4,270,191 A | 5/1981 | Peynaud | |
| 5,077,700 A | 12/1991 | Shaw et al. | |
| 5,122,990 A | 6/1992 | Deines et al. | |
| 5,208,785 A | 5/1993 | Brumley et al. | |
| 5,315,562 A | 5/1994 | Bradley et al. | |
| 5,465,622 A * | 11/1995 | Freking | 73/597 |
| 5,515,338 A | 5/1996 | Stedtnitz | |
| 5,515,721 A | 5/1996 | Kim et al. | |
| 5,531,125 A | 7/1996 | Ahn et al. | |
| 5,615,173 A * | 3/1997 | Brumley et al. | 367/90 |
| RE35,535 E | 6/1997 | Brumley et al. | |
| 5,694,372 A | 12/1997 | Perennes | |
| 5,777,892 A * | 7/1998 | Nabity et al. | 702/143 |
| 5,952,583 A | 9/1999 | Chang | |
| 6,052,334 A | 4/2000 | Brumley et al. | |
| 6,453,256 B1 | 9/2002 | Gordon et al. | |
| 6,590,831 B1 | 7/2003 | Bennett et al. | |
| 6,714,482 B2 | 3/2004 | Rowe | |
| 6,741,209 B2 | 5/2004 | Lee | |

(Continued)

FOREIGN PATENT DOCUMENTS

DE    10 2005 031973    8/2006

OTHER PUBLICATIONS

Wood, J.D.; Boye, D.; , "Monitoring Suspended Sediment Plumes Using an Acoustic Doppler Current Profiler," OCEANS 2007 pp. 1-7, Sep. 29, 2007-Oct. 4, 2007.*

(Continued)

*Primary Examiner* — Thomas Tarcza
*Assistant Examiner* — James Hulka
(74) *Attorney, Agent, or Firm* — Thompson Hine LLP

(57) ABSTRACT

A system and method for measuring the flow of water in cross-section of a body of water is presented. The system and method comprises a housing having a first transducer and a plurality of second transducers, wherein the first transducer produces an acoustic signal for determining the depth of the body of water, and the second transducers each produce an acoustic signal for determining the velocity of a volume of water by measuring the Doppler frequency shift in the returned echo.

41 Claims, 21 Drawing Sheets

U.S. PATENT DOCUMENTS

| | | | |
|---|---|---|---|
| 6,820,008 | B1 | 11/2004 | van Smirren et al. |
| 6,983,208 | B2 | 1/2006 | Metcalf et al. |
| 7,267,013 | B2 | 9/2007 | Maier |
| 7,523,658 | B1 * | 4/2009 | Polonichko et al. ....... 73/170.13 |
| 2003/0076742 | A1 | 4/2003 | Rowe |
| 2008/0080315 | A1 * | 4/2008 | Vogt ................................ 367/90 |
| 2008/0094940 | A1 * | 4/2008 | Brumley et al. ................ 367/90 |
| 2008/0156577 | A1 | 7/2008 | Dietz et al. |
| 2008/0239869 | A1 | 10/2008 | Lohrmann et al. |
| 2008/0289433 | A1 | 11/2008 | Lohrmann et al. |
| 2008/0308343 | A1 | 12/2008 | Vogt |

OTHER PUBLICATIONS

Polonichko, V.; Romeo, J.; , "Effects of transducer geometry and beam spreading on acoustic Doppler velocity measurements near boundaries," OCEANS 2007 , vol., No. pp. 1-6, Sep. 29, 2007-Oct. 4, 2007.*

Lacy, Jessica R., and Christopher R. Sherwood. "Accuracy of a Pulse-Coherent Acoustic Doppler Profiler in a Wave-Dominated Flow." Journal of Atmospheric & Oceanic Technology 21.9 (2004): 1448-1461.*

Spain, P.; Devine, P.; Maier, S.; Vogt, M. "Field evaluation of ADCP refinements for profiling shallower waters" Current Measurement Technology, 2003. Proceedings of the IEEE/OES Seventh Working Conference on, Mar. 13-15, 2003, p. 40-45.*

Brumley, B. et al., "Performance of a broad-band acoustic Doppler current profiler," *IEEE Journal of Oceanic Engineering*, 16, pp. 402-407 (1991).

Simpson and Oltmann, "Discharge-Measurement system using an acoustic Doppler current profiler with application to large rivers and estuaries, United States Geological Survey, Water-Supply Paper 2395" (1993).

Sloat et al., "Methods and Techniques for Moving Vessel Measurements using the SonTek ADP, An introduction to discharge measurements and current surveys," *Methods and Techniques for Real-Time Discharge Measurements*, SonTek/YSI, Inc., San Diego, California (2005).

"Principles of River Discharge Measurement," by SonTek/YSI, Inc., San Diego, California (2003).

PCT, International Search Report and Written Opinion, International Application No. PCT/US2010/028081; 16 pages (Jul. 22, 2010).

PCT, International Search Report and Written Opinion, International Application No. PCT/US2009/067606, 13 pages (Mar. 9, 2010).

Bonnet, M.P. et al., "Floodplain hydrology in an Amazon floodplain lake (Lago Grande de Curaí)," *Journal of Hydrology*, 349, pp. 18-30 (2008).

Oberg, K., "What's New in Hydroacoustics?" United States Geological Survey Training Presentation (on-line), 49 pages (Sep. 2008).

Simpson, M.R., "Discharge Measurements Using a Broad-Band Acoustic Doppler Current Profiler," United States Geological Survey, Open-File Report 01-1 (on-line), 123 pages (2001).

* cited by examiner

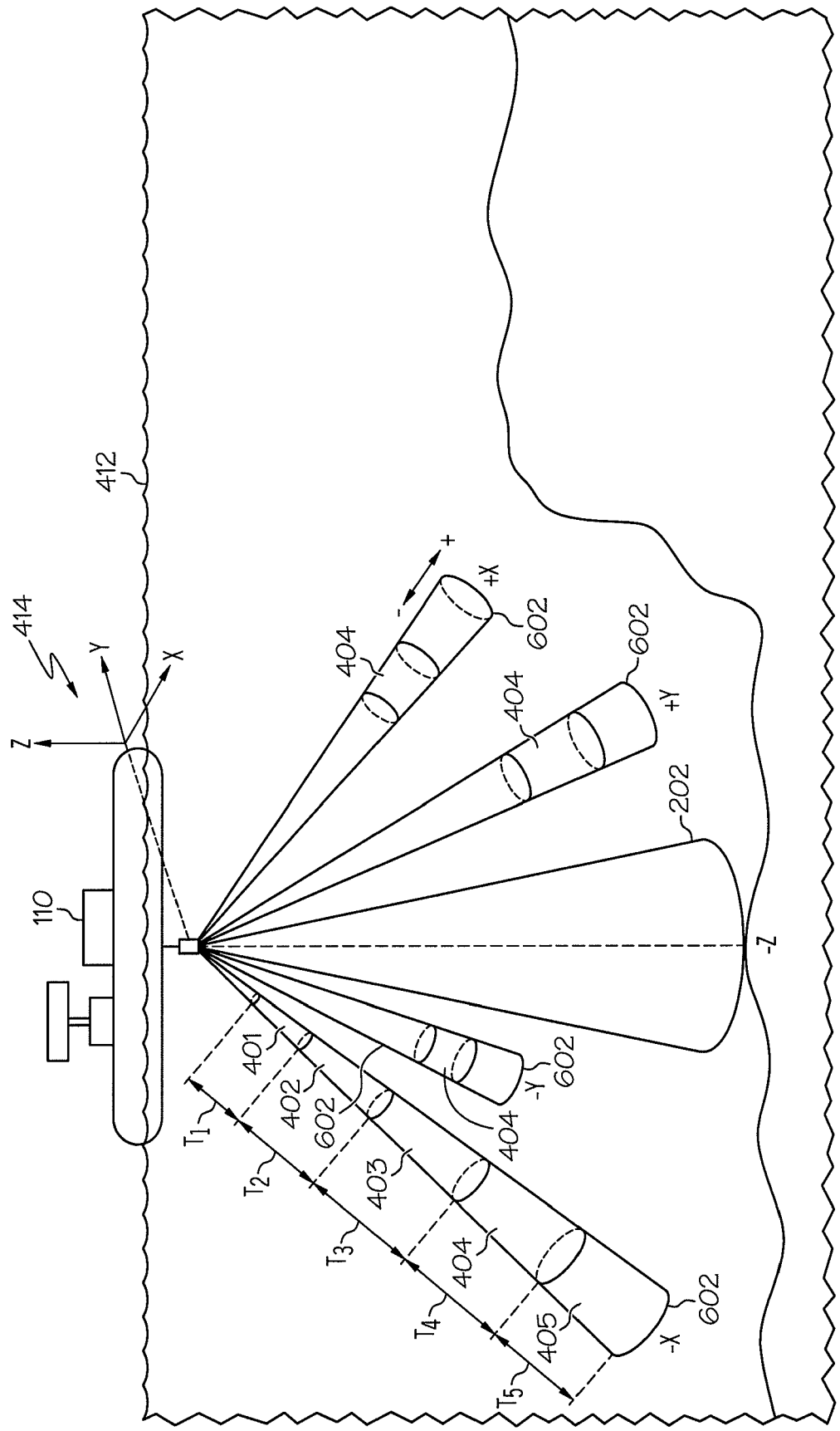

1302

| Discharge Calculation | | | | ☒ |
|---|---|---|---|---|
| Edge Estimates | | | | |
| Start Bank | | | | |
| ○ Left ● Right (Right was selected during measurement) | | RECOMPUTE | OK | |
| | | | Cancel | |
| | Left Bank | Right Bank | Default Settings | |
| Measured distance to bank (m) | 3.5 | 0.7 | | |
| Corrected distance to bank (m) | 3.5 | 0.7 | | |
| Profile used for bank discharge | 96 | 5 | | |
| Computation Method | Sloped Bank ▼ | Sloped Bank ▼ | | |
| | # Profiles 1 | # Profiles 1 | | |

Calculated Parameters

| Discharge | | Quality Parameters | |
|---|---|---|---|
| Total Measured Discharge (m^3/s) | 19.363 | % Measured Discharge: | 76.1% |
| Computed Top Discharge (m^3/s) | 1.1642 | Total Width (m) | 27.9 |
| Computed Bottom Discharge (m^3/s) | 4.7669 | Maximum Depth (m) | 4.20 |
| Computed Left Discharge (m^3/s) | 0.12200 | Max Depth Av. Velocity (m/s) | 0.50 |
| Computed Right Discharge (m^3/s) | 0.016145 | Maximum Boat Speed (m/s) | 0.43 |
| | | Maximum Pitch (deg) | 5.7 |
| Total Computed Discharge (m^3/s) | 25.432 | Maximum Roll (deg) | 0.7 |

Discharge Summary

Total Discharge:

Standard Dev.: 40.81710

Abs. Mean: 1665.812

Coeff of Variation: 0.025

[Delete Record] [Delete All Records] [Copy] [Options] [Close]

| File Name | Start Date | Start Time | End Date | End Time | # Profiles | Track Reference |
|---|---|---|---|---|---|---|
| BFG020625014l | 25/06/2002 | 10:40:21 | 25/06/2002 | 10:44:36 | 52 | Bottom-Track |
| BFG020625014T | 25/06/2002 | 10:45:58 | 25/06/2002 | 10:49:23 | 42 | Bottom-Track |
| BFG020625015l | 25/06/2002 | 10:49:43 | 25/06/2002 | 10:54:08 | 54 | Bottom-Track |
| BFG020625015S | 25/06/2002 | 10:54:29 | 25/06/2002 | 10:59:48 | 65 | Bottom-Track |
| BFG020625020l | 25/06/2002 | 11:00:23 | 25/06/2002 | 11:04:54 | 55 | Bottom-Track |
| Mean | | | | | 54 | |
| Std. Dev. | | | | | 8 | |
| Coefficient of Variation | | | | | 0.153 | |

FIG. 14A

Discharge Report ☒

Print | Save

Discharge Measurement Summary  Date _____

| Station Information | Measurement Information |
|---|---|
| Station Number _____ | Measurement No.  1 |
| Station Name _____ | Compiled By  John Sloat |
| Location  Rhine River, Koblenz Germany | Checked By  John Sloat |

Personal and Equipment
Party ____ JVS, BMG ____    Boat/Motor/Platform ____ 15' Jon Boat/15-hp

Rating Information
| | | | | | |
|---|---|---|---|---|---|
| Gage Height | 2.65 | Rating Discharge | 59000 | Rating No. | 4a |
| GH Change | 0.01 | Index Velocity | 4.1 | Meas. Rating | 4.1 |
| % Diff. | 0.99% | Rated Area | 14000 | Control Code | 14000 |

System Information | System Setup
| System Information | | System Setup | | | |
|---|---|---|---|---|---|
| Serial # | m69 | # of Cells | 22 | Averaging Interval | 5.0 |
| System Frequency | 3000 kHz | Cell Size | 0.98 | Magnetic Decl. | 0.0 |
| Firmware Version | 7.8 | Blanking Distance | 0.66 | Salinity | 0.00 |
| Firmware Version | v3.98 | Transducer Depth | 0.66 | Echo Sounder | Not Pres. |

Discharge Calculation Settings
| | | | | | | | |
|---|---|---|---|---|---|---|---|
| Velocity Ref. | BTrack | Top Estimate | | | Left Bank | | Sloped |
| Track Ref. | BTrack | Bottom Est. | | | Right Bank | | Sloped |
| Depth Reference | ADP | Area Method | | Mean Flow | Orient Profiles | | 5 |

Computed Discharge Results | Diagnostic Files

| Computed Discharge Results | | Diagnostic Files | | |
|---|---|---|---|---|
| Width | 1147.4 | Moving Bead Test | BFG0206250206.adp | Select File |
| Area | 13009.9 | Compress Cal | none | Select File |
| Mean Velocity | 4.50 | Pressure Cal | none | Select File |
| Discharge | 58828.21 | Depth Calibration | none | Select File |
| % Measured | 74.0 | | | |
| Adj. Mean Velocity | 4.20 | | | |

Measurement Results

| Tr# | | Discharge | | | | | | Distance | | | Area | Time | | Mean Vel | | #Profiles | |
|---|---|---|---|---|---|---|---|---|---|---|---|---|---|---|---|---|---|
| | | Top | Middle | Bottom | Left | Right | Total | Left | Right | Total | | Start | End | Boat | Water | Total | Bad |
| 1 | L | 9393 | 43398 | 5703 | 125.8 | 117.8 | 58738 | 10.0 | 15.0 | 1132.0 | 13008.4 | 10:40 | 10:44 | 4.04 | 4.50 | 52 | 0 |
| 2 | R | 9584 | 43808 | 5620 | 250.5 | 53.49 | 59317 | 15.0 | 10.0 | 1154.5 | 12913.0 | 10:45 | 10:49 | 5.11 | 4.57 | 42 | 0 |
| 3 | L | 9066 | 41900 | 5461 | 103.0 | 82.36 | 56612 | 10.0 | 15.0 | 1128.0 | 12725.4 | 10:49 | 10:54 | 3.87 | 4.43 | 54 | 0 |
| 4 | R | 9537 | 43900 | 5461 | 257.7 | 98.90 | 58875 | 15.0 | 15.0 | 1165.1 | 12940.5 | 10:54 | 10:59 | 3.28 | 4.52 | 65 | 0 |
| 5 | L | 9594 | 44956 | 5758 | 172.2 | 119.8 | 60600 | 10.0 | 15.0 | 11.57.3 | 13462.2 | 11:00 | 11:04 | 3.91 | 4.48 | 55 | 0 |
| Mean | | 9435 | 43512 | 5605 | 181.9 | 94.46 | 58828 | 12.0 | 14.0 | 1147.4 | 13009.9 | Total | 00.24 | 4.04 | 4.50 | 54 | 0 |
| SDev | | 221.1 | 1094 | 131.5 | 70.58 | 27.52 | 1440 | 2.7 | 2.2 | 16.4 | 273.7 | | | 0.66 | 0.05 | | |
| COV | | 0.023 | 0.025 | 0.023 | 0.228 | 0.291 | 0.024 | 0.228 | 0.160 | 0.014 | 0.021 | | | 0.164 | 0.011 | | |

Tr 1=; Tr 2=; Tr 3=; Tr 4=; Tr 5=;

Comments
  Comparison measurements made
  _____
  _____

Note: Units for the above parameters are: Distance (ft), Velocity (ft/s), Area (ft2), Discharge (cfs)

FIG. 14B   1404   1302

INTEGRATED MULTI-BEAM ACOUSTIC DOPPLER DISCHARGE MEASUREMENT SYSTEM

BACKGROUND OF THE INVENTION

1. Field of the Invention

Embodiments of the subject matter described herein relate generally to a system and method for determining the flow of water through a cross-section of a body of water.

2. Description of the Related Art

None.

BRIEF SUMMARY OF THE INVENTION

Presented is a system and method for measuring the flow of water through a cross-section of a body of water such as a river. The system and method improves sampling accuracy and permits sampling in deep water and shallow water, or near shores.

In one embodiment, the system and method utilizes an integrated acoustic transducer system comprising a multi-element transducer array operating at one frequency for measuring doppler shifts caused by moving water and a coincident depth sensor transducer operating at a second frequency for measuring the depth of the body of water. In another embodiment, the system and method utilizes an integrated transducer system comprising a first multi-element transducer array operating at a first frequency, a coincident second multi-element transducer array operating at a second frequency, and a coincident depth sensor transducer operating at a third frequency. In another embodiment, the system uses transducers with suppressed primary side lobes. In another embodiment, the system automatically adjusts the cell size used in determining the velocity profile based on the depth of the body of water. In another embodiment, the system selectively turns off transducers when in shallow water or when approaching a bank of a river.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the burst optimized tracking system and method. A brief description of each figure is provided below. Elements with the same reference number in each figure indicated identical or functionally similar elements. Additionally, the left-most digit(s) of a reference number indicate the drawing in which the reference number first appears.

FIGS. 7a and 7b are illustrations of representative beam paths during discharge profiling as a boat moves from deep water to shallow water in one embodiment of the integrated multi-beam acoustic Doppler discharge measurement system and method;

FIGS. 13a, 13b, 13c, and 13d are configuration screens for an exemplary software graphical user interface of one embodiment of the integrated multi-beam acoustic Doppler discharge measurement system and method;

FIGS. 14a, and 14b are discharge summary screens for an exemplary software graphical user interface of one embodiment of the integrated multi-beam acoustic Doppler discharge measurement system and method;

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

An integrated multi-beam acoustic Doppler discharge measurement system measures the discharge of water of a river or other moving body of water. The system comprises a transducer system having a plurality of acoustic Doppler elements.

5-Beam Transducer System

Figure 1:
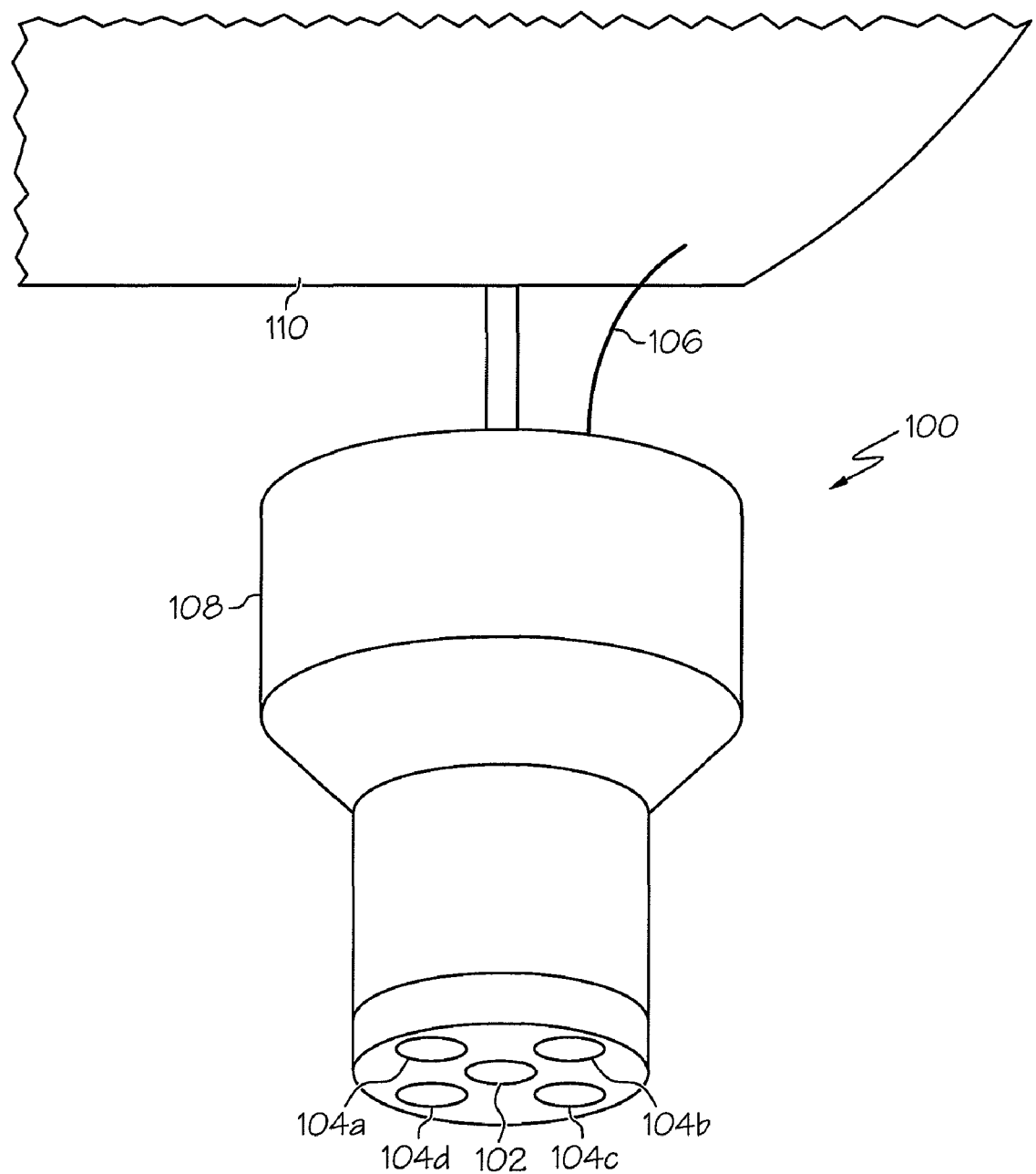
FIG. 1 is an illustration of a 5-beam transducer system in one embodiment of the integrated multi-beam acoustic Doppler discharge measurement system and method.

Referring now to FIG. 1, a graphical representation of a 5-beam transducer system 100 is presented. The 5-beam transducer system 100 comprises a vertical beam transducer 102 mounted centrally in the housing 108, and four profile beam transducers 104 mounted around the vertical beam transducer 102. In one embodiment, the four profile beam transducers 104 are each mounted facing downwards at about a 25 degree angle from the vertical beam transducer 102, and each profile beam transducer 106 is mounted 90 degrees from an adjacent profile beam transducer 106, however other angles are contemplated. A power and signal assembly 106 leads to an electronics package 900 (not shown.)

In operation, the profile beam transducers 104 operate as a discharge profile measuring device and a bottom tracking device for measuring the movement of the 5-beam transducer system 100 relative to the bottom of the river. The vertical beam transducer 102 operates as a depth measuring device.

Discharge Profiling

The profile beam transducers 104 can operate at frequencies in the range of about 100 KHz to about 5 MHz. In one embodiment, the four profile beam transducers 104 are 10 cm acoustic Doppler elements operating at a frequency of 3 Mhz. The high frequency of the profile beam transducers 104 allows for more accurate sampling, but limits the range for profiling to approximately 5 meters.

Figure 3:
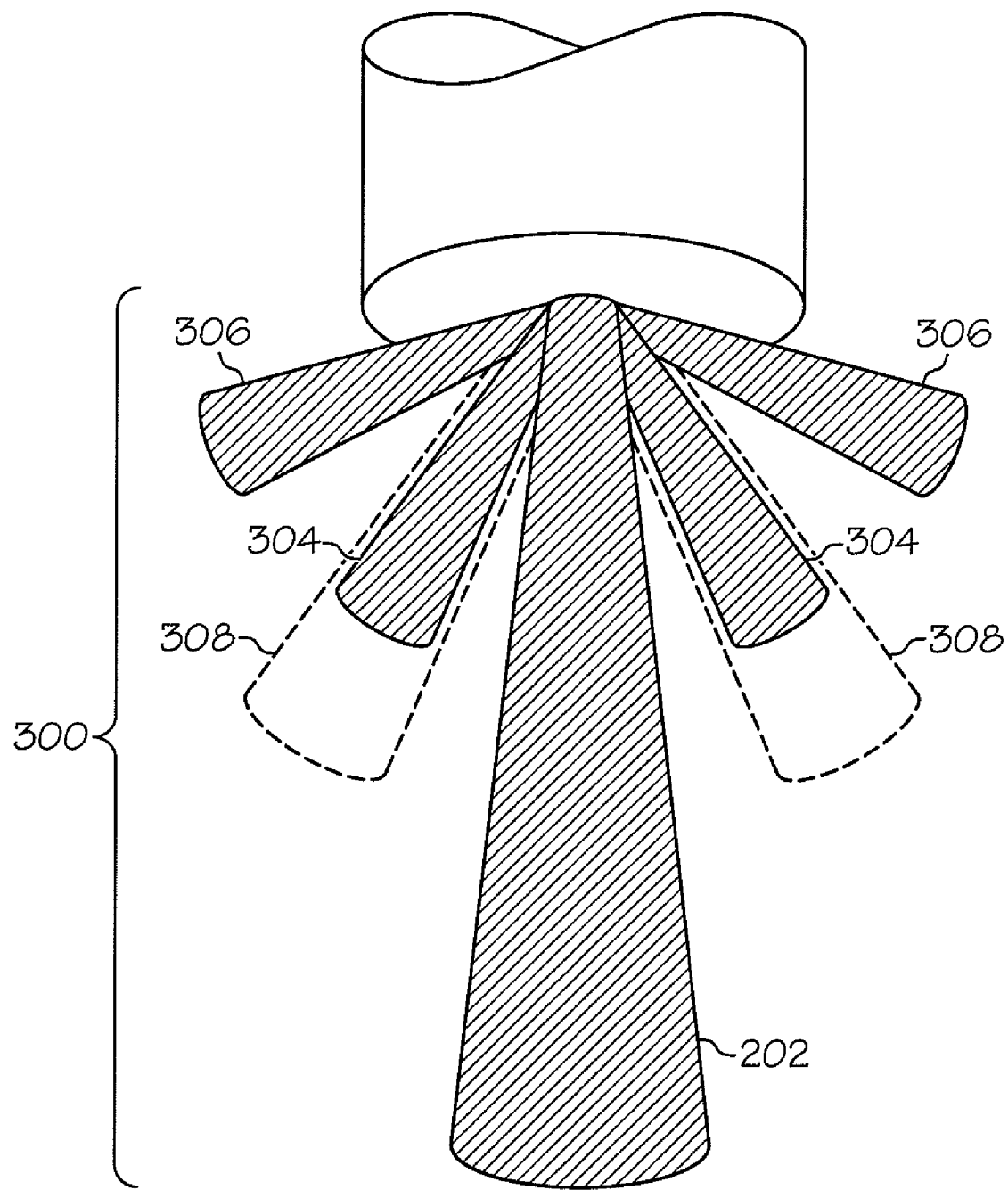
FIG. 3 is an illustration of beam shape for a profile beam transducer with suppressed primary side lobes in one embodiment of the integrated multi-beam acoustic Doppler discharge measurement system and method.

Referring now to FIG. 3, a graphical representation of the shape of the profile beam 300 from the profile beam transducer 104 is presented. The profile beam 300 has a narrow main lobe 302, a suppressed primary side lobe 304, and secondary side lobes 306. The suppressed primary side lobe 304 is suppressed by as much as 20 dB or 100 times the energy level as a non-suppressed primary side lobe 308, as shown by the dotted lines. This is done by shaping the surface and the electrical connection point of the profile beam transducer 104. Profile beam transducer 104 having a suppressed primary side lobe 304 allow for greater acoustic directivity by reducing the amount of received echo normally attributed to non-suppressed primary side lobes 308. Profile beam transducer 104 having suppressed primary side lobes 304 produce significantly less backscatter in shallow water and near river edges, than transducers having non-suppressed primary side lobes 308. Less backscatter results in a better SNR for the returned signals, permitting the 5-beam transducer system 100 to produce more accurate velocity measurements in shallow water and near river edges.

Figure 4A:
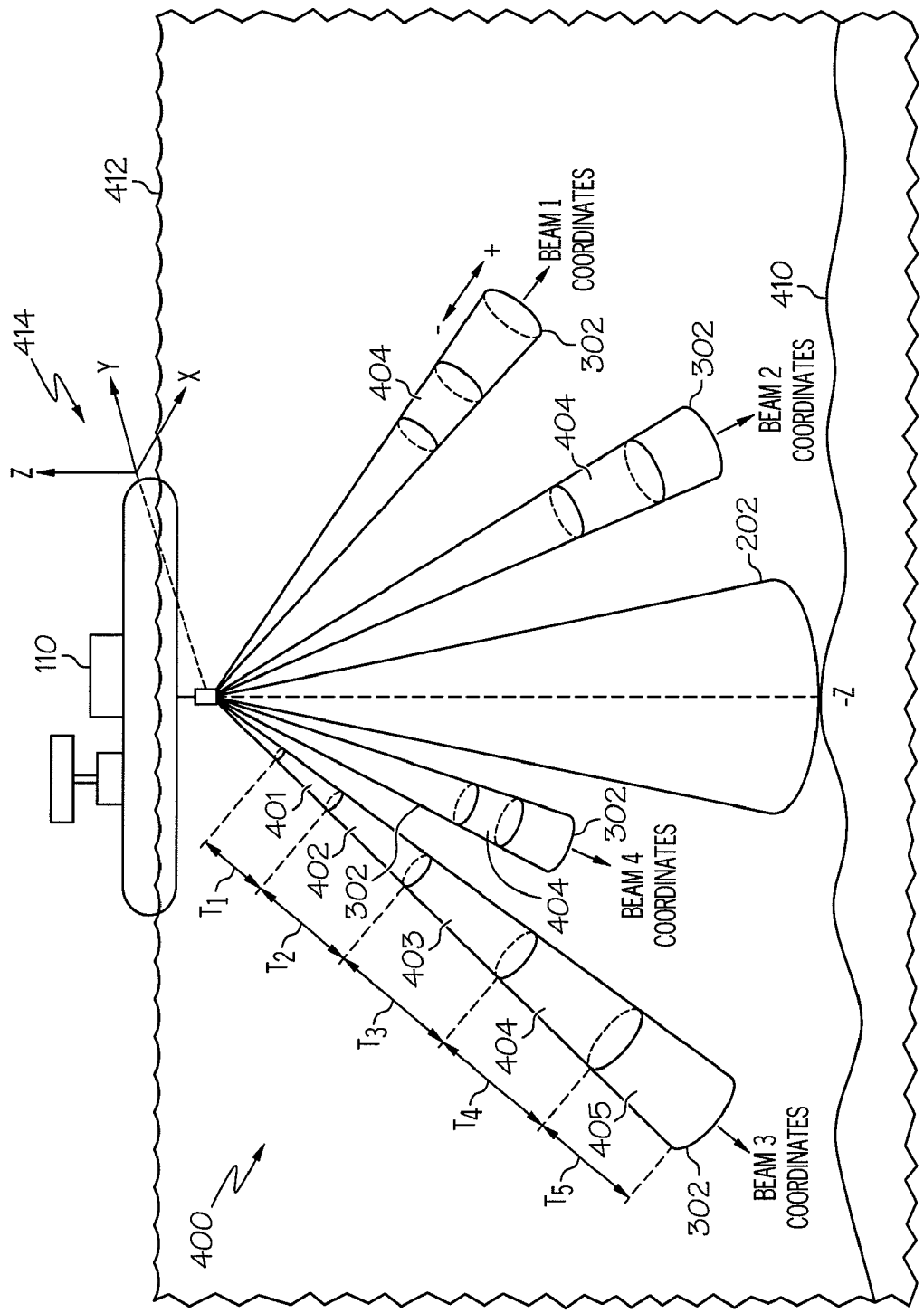
FIG. 4a is an illustration of representative beam paths during discharge profiling in one embodiment of the integrated multi-beam acoustic Doppler discharge measurement system and method.

Referring now to FIG. 4a, a graphical representation showing only the main lobes 202, 302 of each beam 200, 300 of the 5-beam transducer system 100 is presented. The 5-beam transducer system 100 transmits up to about 75 individual pings from each profile beam transducer 104 in a one second interval, or sample. For illustration purposes only, a single ping from each profile beam transducer 104 and vertical beam transducer 102 is illustrated. The vertical beam 200 has a wide beam lobe 202 that is used to determine depth. Each of the profile beams 300 is a narrow beam that is used in conjunction with the other profile beams 300 to perform the discharge profiling and bottom tracking (i.e., determining the speed of the profile beam transducers 104 and housing 108 relative to the bottom of the river/water body).

Referring now to the profile beams 300, the returned signal from each ping is received by the 5-beam transducer system 100 to create the discharge profile. The discharge profile is broken into multiple cells, 401, 402, 403, 404, 405 based on time intervals t1, t2, t3, t4, and t5 following each ping. The returned signal, or returned echo, from each ping is analyzed by time, Doppler shift, and magnitude of the returned signal. The returned signal from each ping is associated with a cell 401, 402, 403, 404, 405 based on the time interval in which the returned signal was received by the 5-beam transducer system 100. For example, each profile beam 300 will produce a return signal during time interval t4 that is associated with cell 404. The Doppler shift of each returned signal provides an indication of rate of the flow of water and suspended sediment in that particular cell 401, 402, 403, 404, 405. A Doppler shift that increases the frequency indicates water is moving towards the profile beam transducer 104, whereas a Doppler shift that decreases the frequency indicates water moving away from the profile beam transducer 104. In the beam coordinate system 414, water moving away from the profile beam transducers 104 is assigned a positive velocity, while water moving toward the profile beam transducers 104 is assigned a negative velocity. The velocity measurements for each cell 401, 402, 403, 404, 405 may be averaged to determine the average velocity of the cell. The average velocity and volume of each cell is integrated to determine the total discharge as discussed in more detail below.

Velocity standard deviation (STD) profiles are used with each profile beam 300. STD is calculated using the individual pings contained with a sample and represents the uncertainty of the mean velocity for that sample. Lower than normal STD indicates hard targets such as fish or hard surfaces. Higher than normal STD indicates moving fish, turbulence, or boat motion. STD increases as signal strength decreases and can be used to determine where to cut off a profile. Generally, larger cell sizes, which average over a larger water volume, will have a lower STD than smaller cells. However smaller cells will have a greater vertical resolution and granularity.

Signal to Noise Ratio (SNR) profiles are used with each profile beam 300. SNR is an amplitude measurement that represents how strong the backscatter strength is relative to the noise floor (no signal). SNR decreases with range from the profile beam transducer 104. Cells close to the profile beam transducer 104 have higher SNR than subsequent cells. A sudden increase in SNR during a later time intervals, t2>t1, t3>t2, t4>t3, etc. indicates a hard target such as a fish or other hard surface. For example, in one embodiment, a 20-30 dB increase in SNR for a particular data measurement indicates that the measurement is likely to be corrupted by backscatter or reflections off an object other than the water and suspended solids in the water. Whether there is an increase in SNR is determined by looking at comparable return signals, for example the return signals from other profile beams 300 for the same time interval, or a moving average of the profile beam 300 itself for the time interval, or if data from a previous transect is available, the SNR can be compared to data from the previous transect. If the data is determined to be erroneous, the data can be replace by an interpolated value, or a previous value.

The profiling range is determine by cell 406 size, profile beam 300 frequency, beam size and shape, transmit power from the profile beam transducer 104, backscatter strength and absorption by the water and particulate discharge. Frequency, power, and beam size and shape are predetermined at the factory. Backscatter strength and absorption are dependent on conditions at the measurement site. Cell 406 size and the number of time intervals in the profiling range is automatically control by the Acoustic Doppler Profiling software. However the range of cell 406 sizes and typical profiling ranges is frequency dependent as shown in Table 1.

TABLE 1

| Transducer Frequency | Typical Profile Range | Cell Size |
| --- | --- | --- |
| 250 KHz | 6-200 meters | 2-20 meters |
| 500 KHz | 3-100 meters | 1-12 meters |
| 1 MHz | .25-30 meters | 0.25-4 meters |
| 3 MHz | 0.1-5 meters | .05-0.5 meters |

As the range to the river bottom 410 increases, the cell size is increased. In one embodiment, the cell size is adjusted to keep at least 5 to 10 cells 406 between the profile beam transducers 104 and the river bottom 410. However, in shallow water there may be as fewer cells.

Figure 4B:
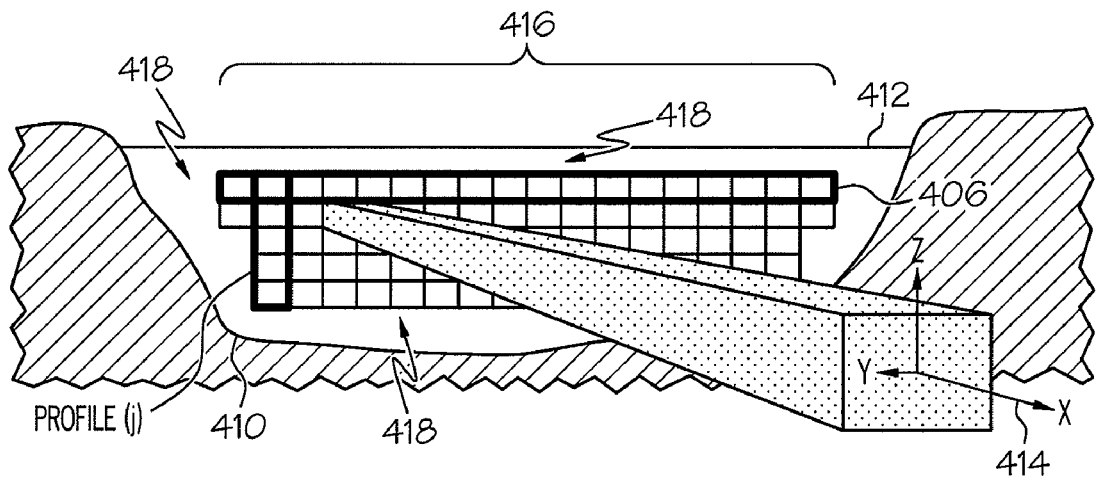
FIG. 4b is an illustration of cells in a cross-section of the river in one embodiment of the integrated multi-beam acoustic Doppler discharge measurement system and method.

Referring now to FIG. 4b, as the vessel 110 traverses the river 400, the 5-beam transducer system 100 collects samples for a cross-section of the river 400 into a set of measured cells 416. To determine the flow of water, the 5-beam transducer system 100 sums the flow calculated for each cell in the set of measured cells 416, and estimates the flow through the unmeasured cross-sectional areas 418.

Figure 4C:
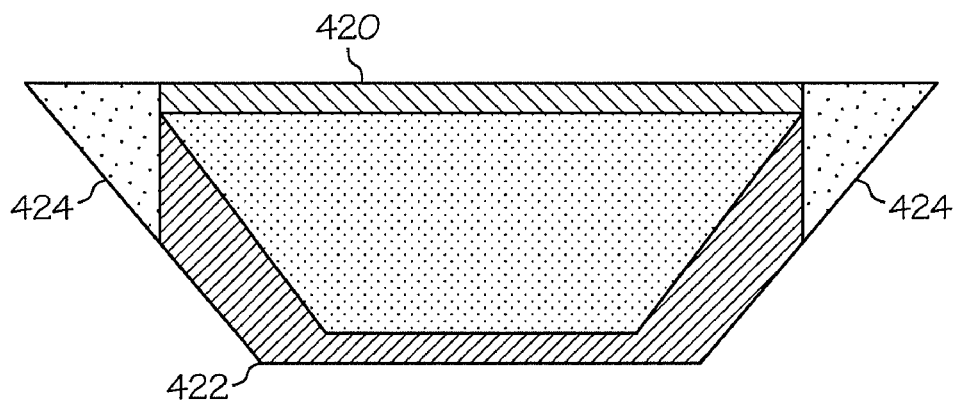
FIG. 4c is an illustration of the unmeasured area of a cross-section of the river in one embodiment of the integrated multi-beam acoustic Doppler discharge measurement system and method.

Referring now to FIG. 4c, the unmeasured cross-sectional areas 418 include the top area 420, the bottom area 422, and the near shore areas 424. The flow across each of these unmeasured cross-sectional areas 418 is estimated separately as described in the algorithm section below. The top area 420 is bounded by the surface 412 of the river 400 and the depth under the profile beam transducers 104 at which sampling first occurs, also called the draft and blanking distance. The draft distance is the distance the housing 108 and profile beam transducers 104 are submerged below the surface 412 of the water. The draft distance is commonly 5 cm to 15 cm in depth, and depending upon the pitch, roll, and vessel 110 speed can be higher or lower so long as the profile beam transducers 104 remain submerged in the water. At higher vessel 110 speeds, cavitation around the housing 108 can occur and the housing 108 must therefore be submerged at greater depths. In one embodiment, a pressure transducer (not shown) in the housing 108 provides an indication of the water depth.

The blanking distance is the minimum distance away from the profile beam transducers 104 at which the first returned signal is sampled for the topmost of the measured cells 416 of a profile. Blanking distance is frequency dependent. Common blanking distances are summarized in Table 2.

TABLE 2

| Transducer Frequency | Blanking Distance |
| --- | --- |
| 250 KHz | 1.0 meters |
| 500 KHz | 0.5 meters |
| 1 MHz | 0.06 meters |
| 3 MHz | 0.05 meters |

The bottom area 422 is bounded by the bottom 410 of the river 400 and the height above the bottom 410 at which sampling for the bottommost of the measured cells 416 occurs. Side-lobe interference makes sampling in the bottom area 422 impractical, and therefore the flow across the bottom area 422 is estimated instead. The near shore areas 424 are the edges of the river 400 are areas where the vessel 110 is unable to travel, and hence unable to sample, due to minimum depth requirements of the vessel 110 or the housing 108 of the 5-beam transducer system 100.

The 5-beam transducer system 100 uses four profile beams 300. However, a three-dimensional velocity solution can be derived using just three profile beams 300. Therefore the additional profile beam 300 provides homogeneity checking of the velocity data.

Temperature, Salinity and Pressure Sensors

To improve the accuracy of the 5-beam transducer system 100, the speed of sound in water is determined by measuring the temperature, salinity and pressure. An error of 1 degree in temperature results in an error of approximately 0.18% in a velocity calculation. An error of 1 part per thousand in salinity results in an error of approximately 0.08% in velocity calculation. And an error of 100 meters in depth (pressure) results in an error of approximately 0.01%. The 5-beam transducer system 100 comprises a temperature sensor (not shown) that is accurate to within plus or minus 0.3 degrees Celsius. In one embodiment, the temperature sensor is housed in the housing 108 and protected with a metal cover that provides a fast reacting thermal connection to the water. The pressure is dependent upon the depth of the water for the particular cell 406 and can be computed independently for each cell 406 from the depth. In one embodiment, the salinity of the water is determined using a CTD sensor. In another embodiment, the CTD sensor is integrated into the housing 110. In another embodiment, the salinity is measured by a user and entered manually into the basic user setup configuration screen 1304 of the graphical user interface 1302.

In various embodiments, these temperature, salinity and pressure settings are transmitted to the communications interface 906 of the electronics package 900 associated with the 5-beam transducer system 100 and stored in the data store 904.

Bottom Tracking

The profile beam transducers 104 also function as a bottom tracking device to a depth of approximately 8 meters. The profile beam transducers 104 provide a three dimensional velocity solution of the speed of the 5-beam transducer system 100 relative to the bottom of the river. An accurate velocity track of the vessel 110 improves the accuracy of the measurements of the river discharge. The 5-beam transducer system 100 mixes several bottom track pings with the profile pings during each sample cycle. The four profile beam transducers 104 provide four independent measurements per ping that results in velocity measurements to better than 1% accuracy.

Compass and GPS

In addition to bottom tracking, in one embodiment, the 5-beam transducer system 100 further comprises a digital compass having an inertial measurement unit that provides heading, pitch and roll. The digital compass allows the 5-beam transducer system 100 to orient the bottom track measurement and the velocity profile measurements to Earth referenced values, and the rotates the beam velocity measurements to East North Up coordinates (ENU), or Earth coordinates.

The digital compass provides heading, pitch and roll measurements at a rate of 8 measurements per second and is accurate to better than 1 degree RMS for the heading, and 1% plus or minus 0.25 degrees for pitch and roll. To correct for local distortions in the Earth's magnetic field caused by hard and soft iron materials in the vicinity of the heading sensors, the compass has a built in calibration routing that is performed in the field prior to deployment of the 5-beam transducer system 100 or when changes to the mounting fixture on the vessel 110 occurs.

The 5-beam transducer system 100 also comprises a GPS system for additional reliability of the velocity track, and for situations where the depth of the river bottom is greater than the range of the bottom tracking system. The GPS system in various embodiments is non-differential, differential, and RTK depending on the required accuracy. See commonly assigned U.S. application Ser. No. 11/956,472 filed Dec. 14, 2007 for a particular example of one such GPS implementation, hereby incorporated by reference.

In various embodiments, the compass and GPS data are transmitted to the communications interface 906 of the electronics package 900, stored in the data store 904, and are used to determine the precise position and orientation of the 5-beam transducer system 100.

Depth Sensing

The profile beam transducers 104 permit depth sensing but are susceptible to high backscatter and moving bed conditions. Also, the profile beam transducers 104 have narrow 3 Mhz beams and each is mounted on the housing 108 of the 5-beam transducer system 100 at an angle relative to the bottom of the river. The integrated vertical beam transducer 102, being vertically mounted and having a lower frequency, allows both greater accuracy and a longer range for measuring the depth of the river. Because the vertical beam transducer 102 is at a different frequency than the profile beam transducers 104, the returned signals will not interfere with each other.

The depth measurements from the vertical beam transducer 102 are used to calibrate the depth calculated by the four profile beam transducers 104. By integrating the vertical beam transducer 102 with the profile beam transducers 104 in the same housing, there are both temporal and positional improvements to the accuracy of the discharge profiling and bottom tracking systems. Because the vertical beam transducer 102 is part of the same systems as the four profile beam transducers 104, there are no electronic delays in sending pings. Depth pings can therefore be interleaved more closely together with profile pings without having to take into account delays, or wait cycles, caused by slower communications links, thereby allowing more samples to be taken in each cycle.

There is increased positional consistency between the vertical beam 200 and profile beams 300 because the vertical beam 200 from vertical beam transducer 102 is coincident with a portion of each of the profile beams 300 from the four profile beam transducers 104. Therefore the 5-beam transducer system 100 can correlated the measurements of the profile beams 300 with the depth measurement from the more accurate vertical beam 200. When using the profile beams 300 to determine depth, backscatter from suppressed primary sidelobes 304 and adjacent profile beams 300 can contribute to errors in determining the depth of the river 400. Having a second method of determining the depth using the vertical beam 200 and correlating the measurements of the profile beams 300 with the depth measurement from the more accurate vertical beam 200 produces more accurate measurements for the profile beams 300 for both depth sensing and profile measurements. Accurate depth sensing allows the 5-beam transducer system 100 to dynamically adjust the size of each cell, 401, 402, 403, 404, 405 based on changes in the depth and place cells closer to the bottom of the river 400, thereby maximizing the amount of velocity data gathered and minimizing error from backscattering. This in turn improves the velocity measurements and STD in each of the cells 401, 402, 403, 404, 405, particularly those cells 401, 402, 403, 404, 405 near the bottom of the river 400.

The vertical beam transducer 102 may operate a frequency of about 100 KHz to 5 MHz. In one embodiment, the vertical beam transducer 102 operates at a frequency of 1 MHz. The vertical beam transducer 102 produces a downward facing vertical beam 200 and accurately measures depths to within 0.1% of true depth (based on the speed of sound at the face of the transducer for a body of water having a homogeneous temperature) with a single ping resolution of 1 mm. The vertical beam transducer 102 has a maximum range of about 15 meters.

Figure 2:
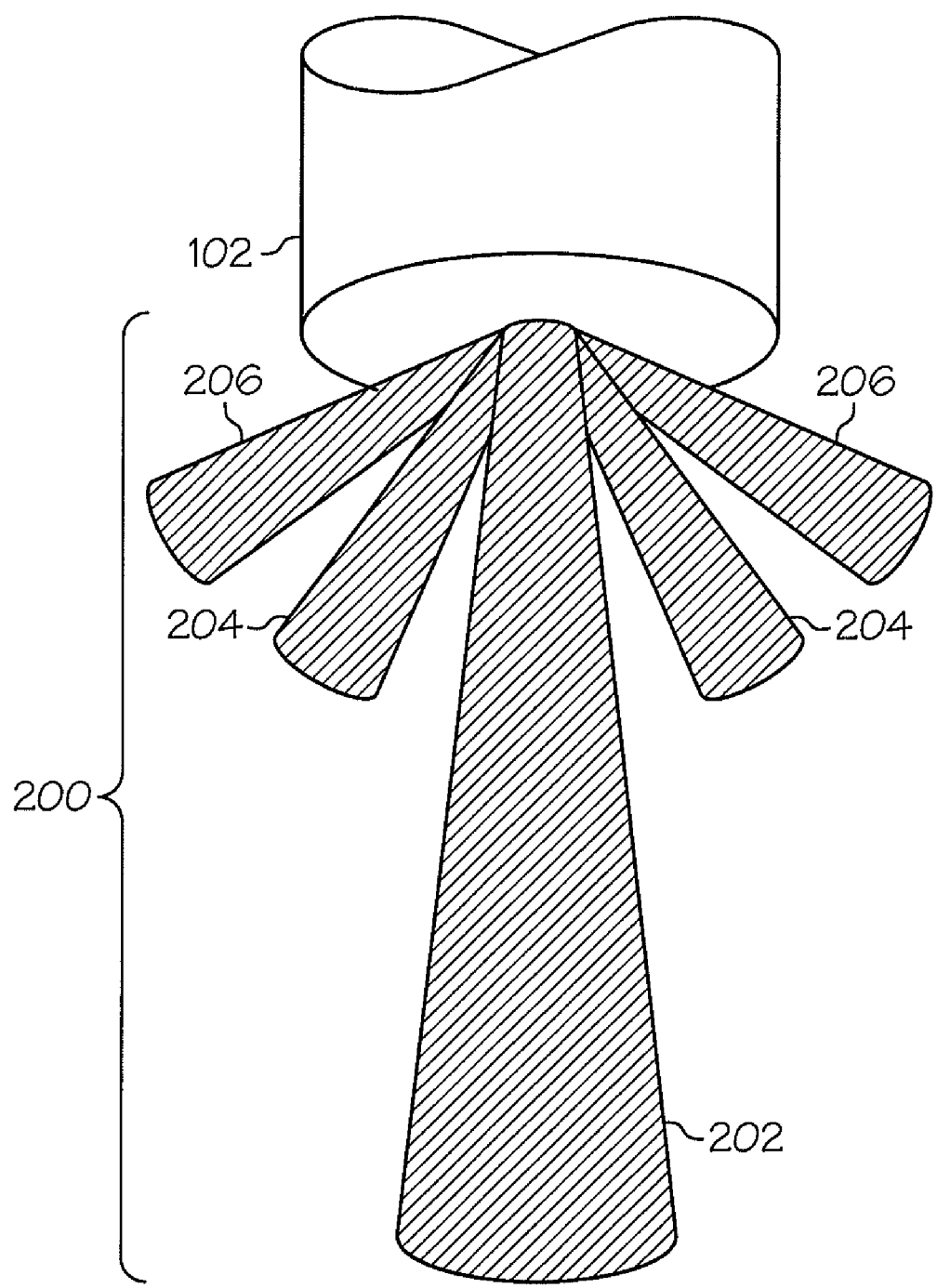
FIG. 2 is an illustration of beam shape for vertical beam transducer in one embodiment of the integrated multi-beam acoustic Doppler discharge measurement system and method.

Referring now to FIG. 2, a graphical representation of the shape of the vertical beam 200 from the vertical transducer 102 is presented. The vertical beam has a wide main lobe 202, a primary side lobe 204, and second side lobes 206. The vertical beam transducer 102 is typically smaller in diameter than the profile beam transducers 104 and therefore produces a wide main lobe 202 that is more robust for determining depth below the 5-beam transducer assembly. A narrow beam is more susceptible to pitch and roll in the surface boat or transducer platform (not shown) to which the 5-beam transducer system 100 is secured. Even at small angles pitch or roll angles, the main lobe of a narrow beam can become oriented off of the vertical axis, thereby increasing the distance the main lobe must travel to reach the bottom, and thereby causing the returned echo to register an erroneous increase in the depth measured. The wide main lobe 202 is more susceptible to inaccuracies in the depth measurement caused by small angles of pitch and roll, for example a vertical beam 200 having a 6 degree wide vertical beam will be generally unaffected by plus or minus 3 degree angles of pitch and roll, and accurate to within a few percent for several additional degrees of pitch and roll. With a wider vertical beam 200, at least a portion of the wide main lobe 202 remains normal to the bottom of the river, even during small angles of pitch and roll, and therefore returns an echo that accurately reflects the depth.

Edge Measurements

Figure 8:
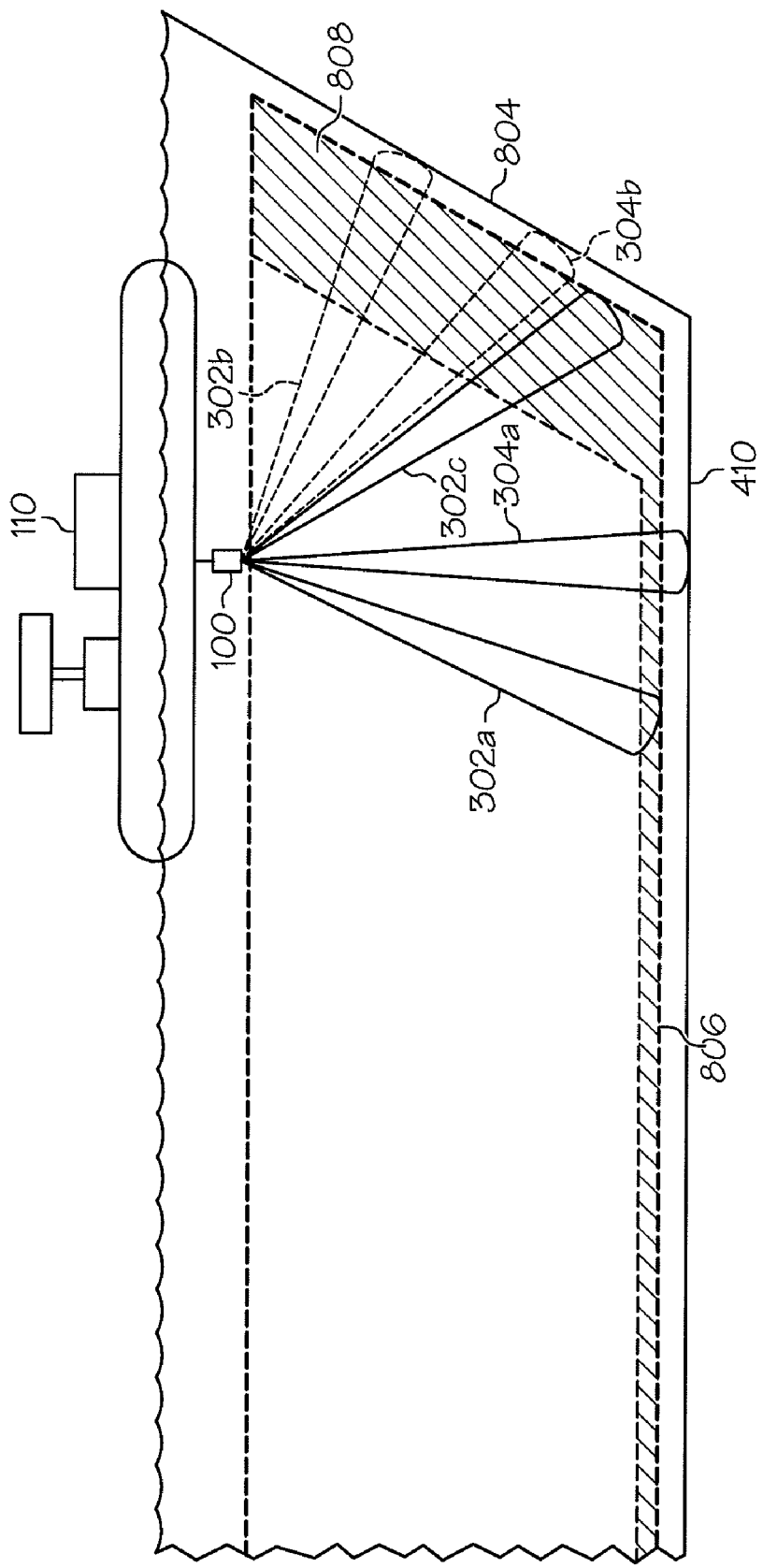
FIG. 8 is an illustration of representative beam paths during discharge profiling near a river edge in one embodiment of the integrated multi-beam acoustic Doppler discharge measurement system and method.

Referring now to FIG. 8, the improved accuracy of the depth measurement permits the 5-beam transducer system 100 to measures water velocities closer to the river bottom 410 producing an extended bottom range 806. The coincident vertical beam transducer 102 provides the 5-beam transducer system 100 with depth information that permits the 5-beam transducer system 100 to more accurately predict when the return signals are from the main lobe 302 of the profile beam 300 when the return signals are likely contain echo from the suppressed primary side lobe 304.

Because the primary side lobes of the profile beam 300 are suppressed primary side lobes 304, the 5-beam transducer system 100 is able to continue to take measurements as the vessel 110 approaches the river edge 804 than a system without suppressed side lobes. As the boat continues to approach the river edge 804, the SNR will be reduced as the suppressed primary side lobes 304 hit the river edge 804 and create backscatter that interferes with portions of the returned signal.

As the 5-beam transducer system 100 nears the river edge 804, backscatter from the suppressed primary side lobe 304b and even the main lobe 302b also will begin to interfere with measurements from main lobe 302c. To reduce this interference and enable the 5-beam transducer system 100 to continue taking measurements close to the river edge 804, the 5-beam transducer system 100 selectively turns off profile beam transducer 104b, eliminating the backscatter caused by suppressed primary side lobe 304b or main lobe 302b returned from the river edge 804 and producing an extended edge range 808. The 5-beam transducer system 100 selectively turns off the profile beam transducer 104b when an abrupt change in SNR indicates interference, for example a sudden 20-30 dB increase in returned echo, a depth measurement indicates a likelihood of interference, or when a user issues a command to the 5-beam transducer system 100 to selectively turn off the profile beam transducer 104*b*.

9-Beam Transducer System

Figure 5:
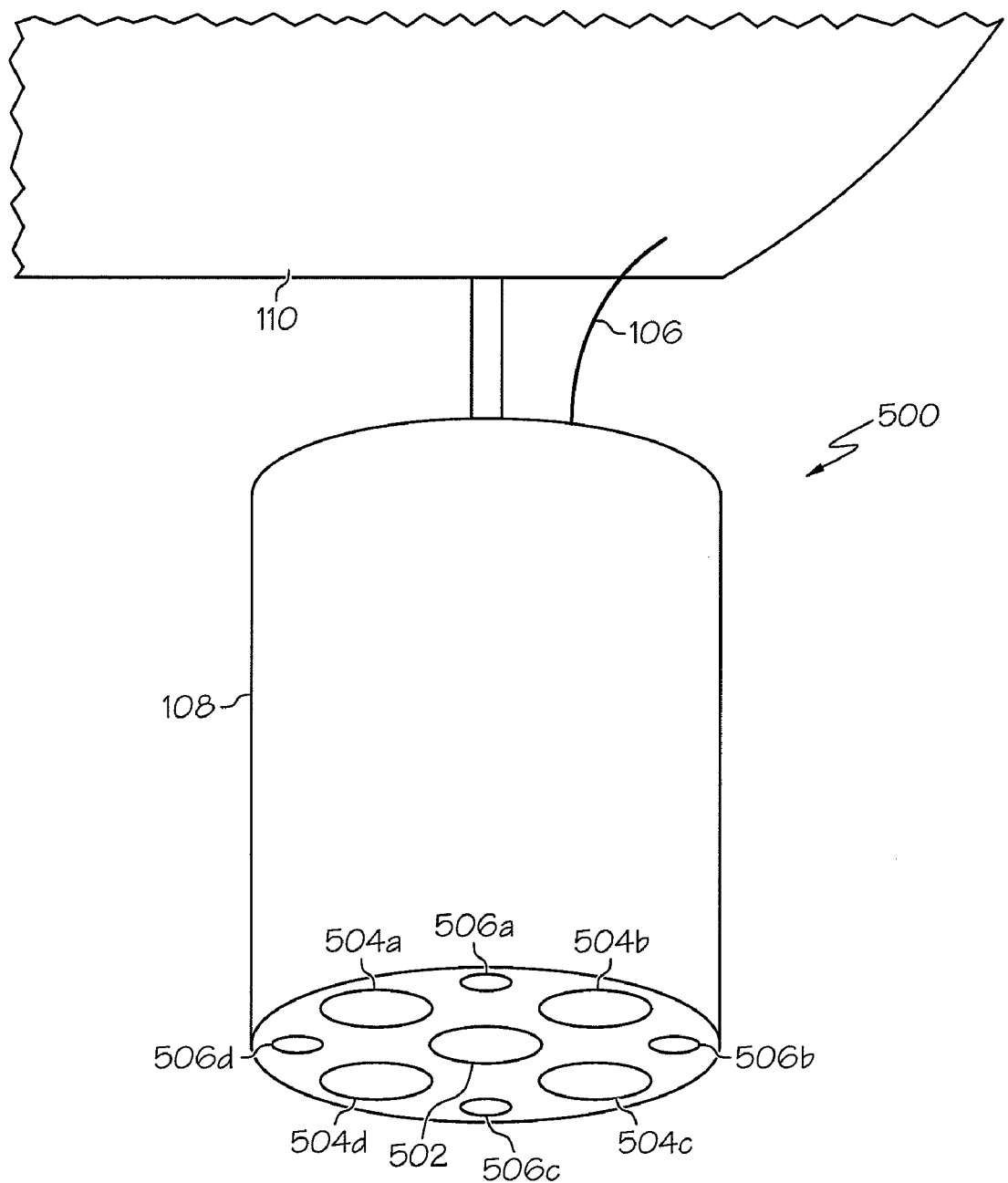
FIG. 5 is an illustration of a 9-beam transducer system in one embodiment of the integrated multi-beam acoustic Doppler discharge measurement system and method.

Referring now to FIG. 5, a graphical representation of a 9-beam transducer system 500 is presented. The 9-beam transducer system 500 comprises a low frequency vertical beam transducer 502 mounted centrally in the housing 108, four mid-frequency profile beam transducers 504 and four high frequency profile beam transducers 506 mounted around the low frequency vertical beam transducer 502. A power and signal assembly 106 leads to an electronics package (not shown.)

In operation, the mid-frequency profile beam transducers 504 (e.g., 100 KHz to 1.5 Mhz) and high frequency profile beam transducers 506 (e.g., 1 Mhz to 5 Mhz) operate both as a discharge profile measuring device and a bottom tracking device for measuring the movement of the 9-beam transducer system 500 relative to the bottom of the river. The low frequency vertical beam transducer 502 operates as a depth measuring device.

Discharge Profiling

In one embodiment, the four mid-frequency profile beam transducers 504 are 30 cm acoustic Doppler elements operating at a frequency of 1 Mhz. The four high frequency profile beam transducers 506 are 10 cm acoustic Doppler elements operating at a frequency of 3 Mhz. The mid-frequency profile beam transducers 504 allow profiling to a range of approximately 25 meters. The higher frequency of the high frequency profile beam transducers 506 allows for more accurate sampling, but limits the range for profiling to approximately 5 meters.

Figure 6A:
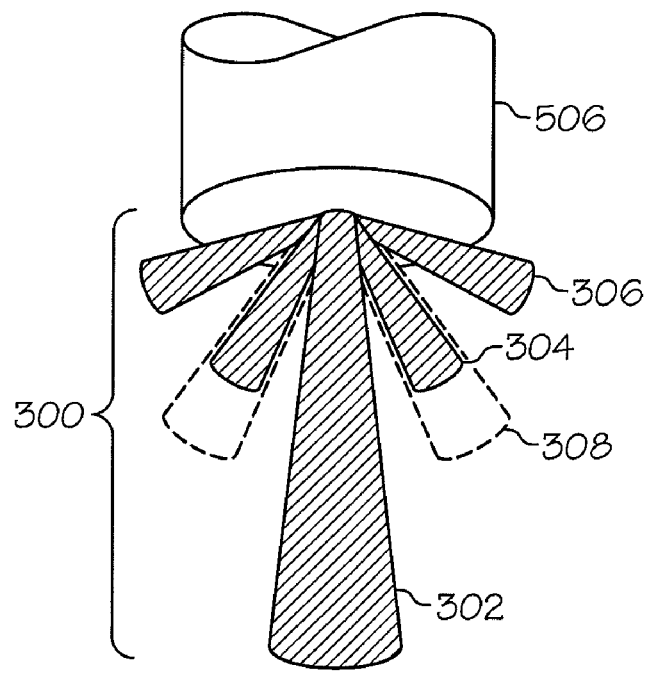
FIGS. 6a and 6b are illustrations of beam shapes for a high-frequency profile beam transducer and a mid-frequency profile beam transducer, respectively, in one embodiment of the integrated multi-beam acoustic Doppler discharge measurement system and method.

Referring now to FIG. 6*a*, a graphical representation of the shape of the profile beam 300 from the high frequency profile beam transducer 506 is presented. The profile beam 300 has a narrow main lobe 302, a suppressed primary side lobe 304, and secondary side lobes 306. The suppressed primary side lobe 304 is suppressed by as much as 20 dB or 100 times the energy level as a non-suppressed primary side lobe 308, as shown by the dotted lines. This is done by shaping the surface and the electrical connection point of the high frequency profile beam transducer 506.

Figure 6B:
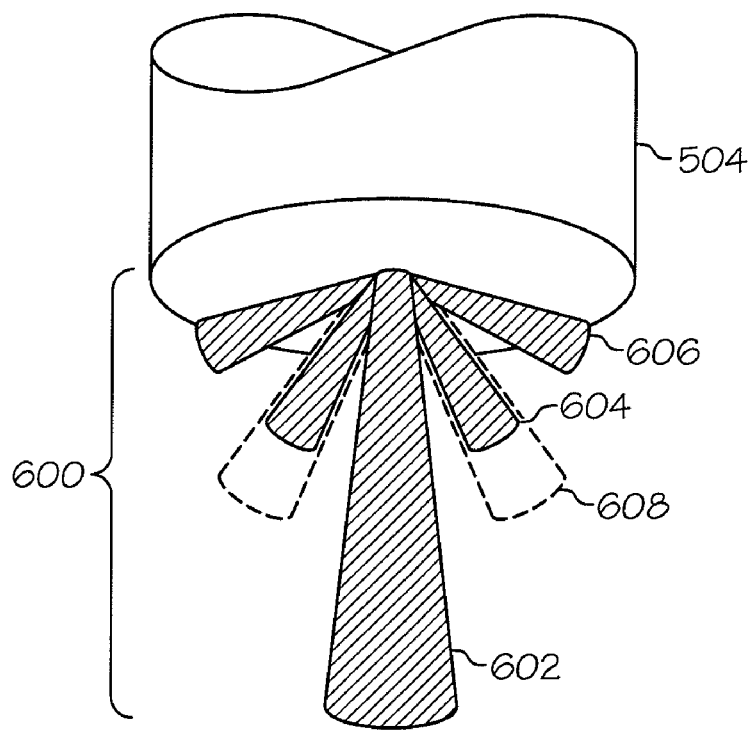

Referring now to FIG. 6*b*, the mid-frequency profile beam transducer 504 also has suppressed mid-frequency primary side lobes 604, and secondary mid-frequency side lobes 606. The suppressed mid-frequency primary side lobe 604 is suppressed by as much as 20 dB or 100 times the energy level as a non-suppressed primary side lobe 608, as shown by the dotted lines. This is done by shaping the surface and the electrical connection point of the mid-frequency profile beam transducer 504.

The high frequency profile beam transducer 506 with suppressed primary side lobe 304 permits greater acoustic directivity by reducing the amount of returned signal normally attributed to non-suppressed primary side lobes 308. Suppressed primary side lobes 304 allow the 9-beam transducer system 500 to receive accurate information from the high frequency profile beam transducers 506 in shallower water and nearer to boundary locations, such as the sides of rivers, than do transducers with non-suppressed primary side lobes 308.

Referring now to FIG. 7*a*, a graphical representation showing only the main lobes 602 of each mid-frequency profile beam 600 of the mid-frequency transducers 504 for the 9-beam transducer system 500 is presented. When in deep water, the 9-beam transducer system 500 selectively uses the mid-frequency transducers 504 because of their greater range.

The 9-beam transducer system 500 transmits up to 20 individual pings from each mid-frequency profile beam transducer 504 in a one second interval, or sample. For illustration purposes only, a single ping from each mid-frequency profile beam transducer 504 and low frequency vertical beam transducer 502 is illustrated. The vertical beam 200 has a wide beam lobe 202 that is used to determine depth. Each of the mid-frequency profile beams 600 is a narrow beam that is used in conjunction with the other mid-frequency profile beams 600 to perform the discharge profiling and bottom tracking.

Referring now just to the mid-frequency profile beams 600, the returned signal from each ping is received by the 9-beam transducer system 500 to create the discharge profile. The discharge profile is broken into multiple cells, 401, 402, 403, 404, 405 based on time intervals t1, t2, t3, t4, and t5 following each ping. The returned signal from each ping is analyzed by time, Doppler shift, and magnitude. The returned signal from each ping is associated with a cell 401, 402, 403, 404, 405 based on the time interval in which the returned signal was received by the 9-beam transducer system 500. For example, each mid-frequency profile beams 600 will produce a return signal during time interval t4 that is associated with cell 404. The Doppler shift of each returned signal provides an indication of rate of the flow of water and suspended sediment in that particular cell 401, 402, 403, 404, 405. A Doppler shift that increases the frequency indicates water is moving towards the mid-frequency profile beam transducer 504, whereas a Doppler shift that decreases the frequency indicates water moving away from the mid-frequency profile beam transducer 504. In the beam coordinate system 414, water moving away from the profile beam transducers 104 is assigned a positive velocity, while water moving toward the profile beam transducers 104 is assigned a negative velocity. The velocity value for each cell 401, 402, 403, 404, 405 is averaged over the sample.

Figure 7B:
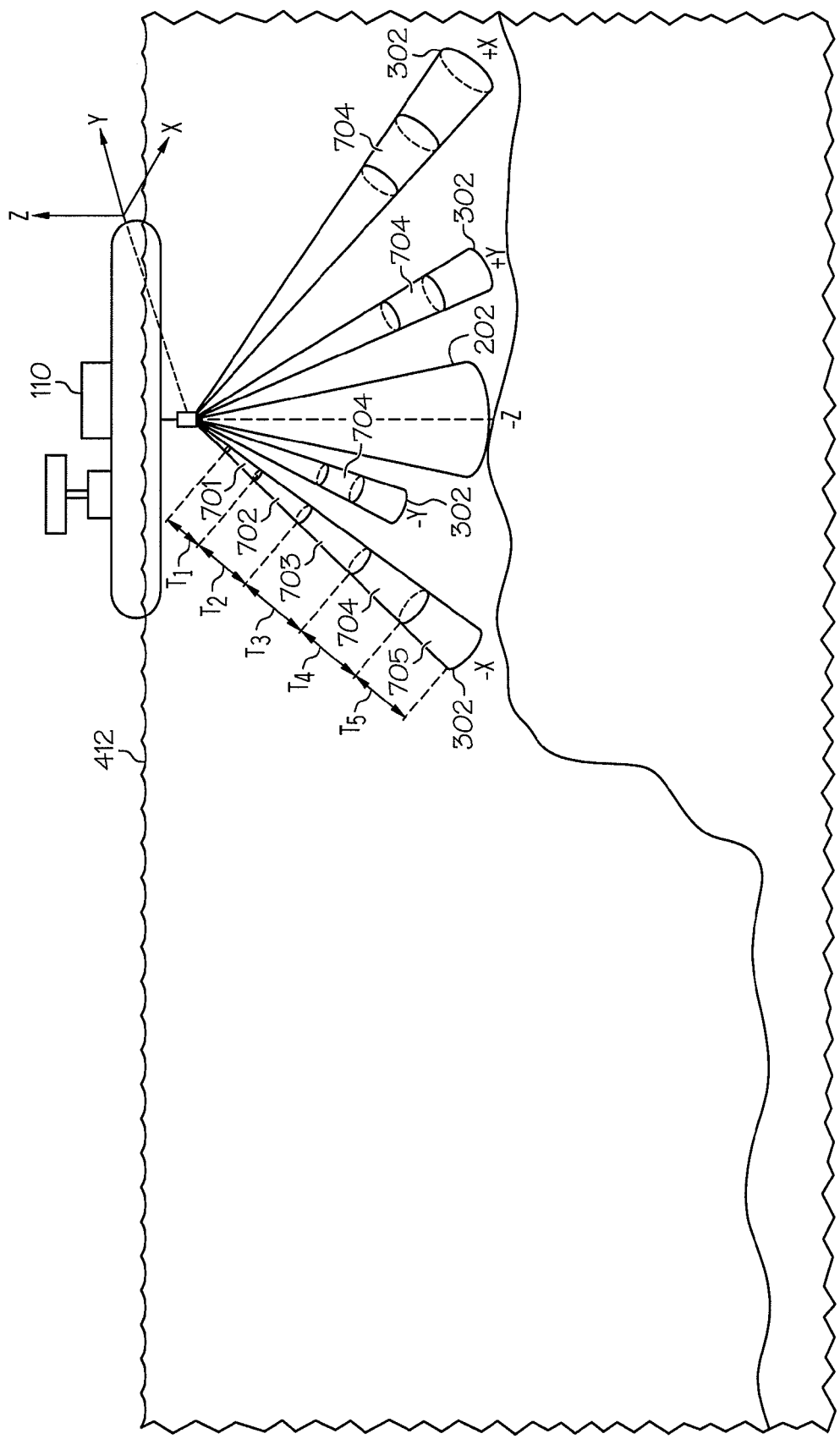

Referring now to FIG. 7*b*, a graphical representation showing only the main lobes 302 of each profile beam 300 of the high-frequency transducers 504 for the 9-beam transducer system 500 is presented. As the 9-beam transducer system 500 transitions to shallower water, the 9-beam transducer system 500 selectively turns off the mid-frequency transducers 504 and begins to use the high-frequency transducers 506. The high-frequency transducers 506 permit greater resolution and smaller cell size, as illustrated by the smaller cells 701, 702, 703, 704, 705. Using pulse coherent profiling the 9-beam transducer system 500 allows discharge profiling measurements in water as shallow as 25 cm. This permits the 9-beam transducer system 500 to accurately measure discharge profiles in shallow water such as flood plains during flooding. Velocity measurements using the high-frequency transducers 506 have an accuracy that is within 1% of the actual velocity with sub-millimeter resolution in the water column.

However, the 3 MHz beams 300 from the high-frequency transducers 506 are more sensitive to small particulate suspended in the water than are the mid-frequency transducers 504 which operate at 1 MHz. Small particulate in the water induces backscatter and degrades the velocity measurements. If backscatter begins to interfere with measurements, the 9-beam transducer system 500 turns off the high-frequency transducers 506 and uses the mid-frequency transducers 504.

In another embodiment, the 9-beam transducer system 500 concurrently utilizes both the mid-frequency transducers 504 and the high-frequency transducers 506. The high-frequency transducers 506 allow measurements with increased resolution for depths up to 5 meters and overlap with the measurements taken using the mid-frequency transducers 504, which provides accurate measurements of the water column up to 25 meters. Multiple smaller cells 701, 702, 703, 704, 705 from the high-frequency transducers 506 will overlap with one or more cells 401, 402, 403, 404, 405 from the mid-frequency transducers 504 that are within the 5 meter range of the high-frequency transducers 506. The 9-beam transducer system 500 analyzes the differences in these overlapping cells to produce a more accurate measure of the flow of water in that part of the water column.

Depth Sensing

The mid-frequency transducers 504 produce narrow mid-frequency profile beams 600 and permit depth measurement up to approximately 40 meters. The high-frequency profile beam transducers 506 produce narrow profile beams 300 and permit depth measurement to approximately 5 meters. The integrated low frequency vertical beam transducer 502, being vertically mounted and having a lower frequency, allows both greater accuracy and a longer range for measuring the depth of the river. Because the low frequency vertical beam transducer 502 is at a different frequency than either the mid-frequency transducers 504 or the high-frequency profile beam transducers 506, the returned signals will not interfere with each other.

The low frequency vertical beam transducer 502 operates at a frequency of 0.5 MHz. The low frequency vertical beam transducer 502 accurately measures depths to within 0.1% of true depth (based on the speed of sound at the face of the transducer) with a single ping resolution of 1 mm. The low frequency vertical beam transducer 502 has a maximum range of 80 meters.

Discharge Algorithms and Method

Figure 10:
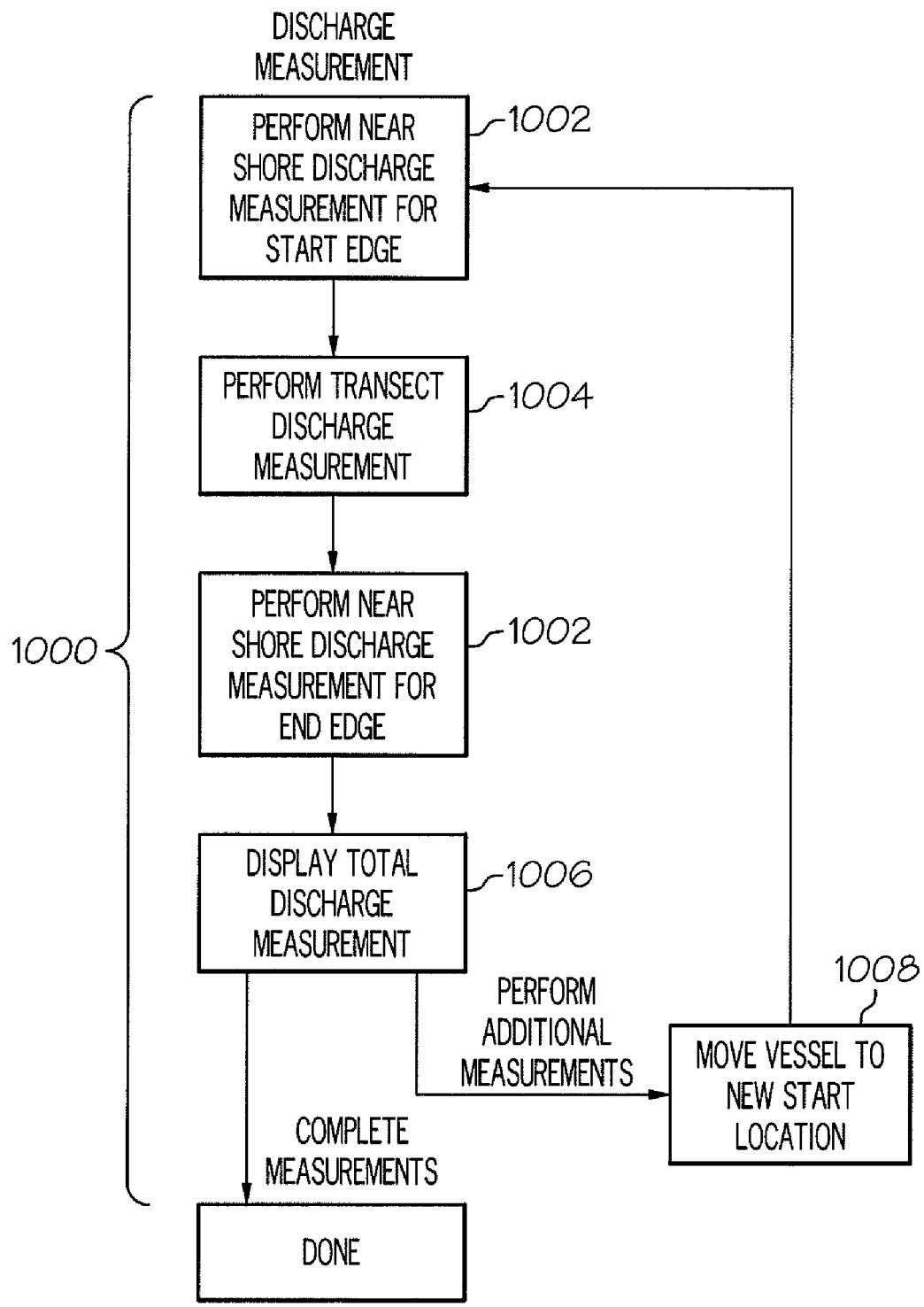
FIG. 10 is a flowchart of a discharge measurement method of one embodiment of the integrated multi-beam acoustic Doppler discharge measurement system and method.

Referring now to FIG. 10, discharge measurement 1000 is determined by first performing a near shore discharge estimate 1002 at on a start edge of a body of water, then performing a transect discharge measurement 1004 from the start edge, across the body of water, to the end edge, and then performing another near shore discharge estimate 1002 at the end edge of the body of water, and displaying the total discharge measurement 1006. Discharge measurements 100 are repeated four or more times to develop an average of the total discharge. In an embodiment, once the vessel 110 is at the end edge, the additional near shore discharge estimates 1002 and transect discharge measurement 1004 are repeated starting at the end edge and moving back to the start edge (i.e., the vessel 110 does not move 1008 back to the start edge, but instead the end edge from the prior discharge measurement 1000 becomes the start edge for this discharge measurement 1000.)

Figure 11:
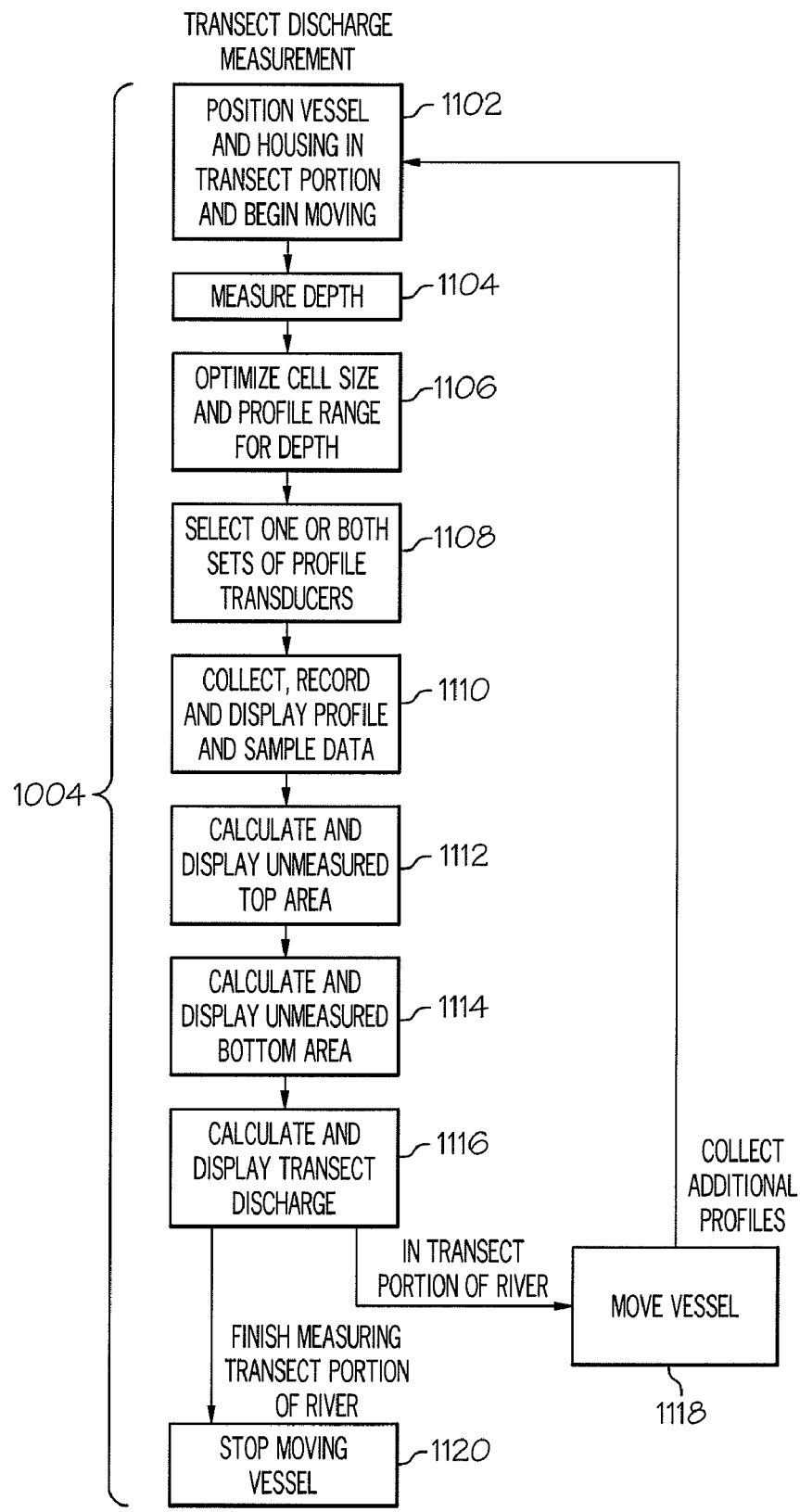
FIG. 11 is a flowchart of a transect discharge measurement method of one embodiment of the integrated multi-beam acoustic Doppler discharge measurement system and method.

Referring now to FIG. 11, to perform the transect discharge measurement 1004, the vessel 110 and housing 108 are positioned 1102 in the transect portion 416 of the body of water and the vessel is moved across the body of water. The 5-beam transducer system 100 or 9-beam transducer system 500 measures 1104 the depth of the body of water. The system 100, 500 then optimizes 1106 the cell size 406 and profile range to the depth measurement. The 9-beam transducer system 500 selects 1108 either one set or both sets of transducers 504, 506. The system 100, 500 collects, records, and displays 1110 the profile and sample data. The profile and sample data is recorded to the data store 904, and if the profile and sample data are communicated to an external PC or mobile device, the data is displayed. The system 100, 500 then calculates 1112, 1114, 1116 and displays the top area 420, the bottom area 422, and the transect 416. If the vessel 110 is still in the transect 416, the vessel 110 is moved 1118, and the process beginning at measuring 1104 the depth begins again at the new position of the vessel 110. Once the vessel 110 nears an edge, the vessel is stopped 1120 and the transect 416 portion is completed.

General Discharge Calculation

The algorithm for calculating the discharge is based on concept of the cross product (the f value) of the velocity vector at a depth cell and the boat velocity vector as presented by Simpson, and Oltmann (1990) and Gordon (1989.) The general equation for calculating 112, 114, 116 river 418 discharge is written as follows:

$$Q = \int \int_S u \cdot \xi \, ds \qquad (1)$$

where Q is the discharge, S is the cross-section area along a vessel's 110 track, u is the water velocity vector, and $\xi$ is the unit vector normal to the vessel's 110 track at a differential area ds. ds is determined by the following:

$$ds = |V_b| \cdot dz \cdot dt \qquad (2)$$

where dz is the differential depth, dt is the differential time, and $V_b$ is the vessel's 110 velocity vector and $|V_b|$ is the vessel's 110 speed. z is the vertical coordinate, z=0 is the river bottom 410, and z=H is the water surface 412. $|V_b|$ is determined from the following:

$$|V_b| = \sqrt{V_{bx}^2 + V_{by}^2} \qquad (3)$$

where Vbx and Vby are the x and y components of the vessel 110 velocity vector, respectively, and (x, y) is a fixed globe coordinate in the horizontal plane.

Thus, Eq. (1) can be re-written as:

where T is the total transect time. In practice, this integer is replaced by the summation of velocity $$Q = \int_0^T \left[ \int_0^H u \cdot dz \right] \cdot \xi |V_b| \cdot dt \qquad (4)$$

measurements made for the small segments along the cross section:

$$Q = \sum_{i=1}^m [(V \cdot \xi)|V_b|]_i \cdot H_i \Delta t \qquad (5)$$

$$= \sum_{i=1}^m [(V \times V_b) \cdot k]_i \cdot H_i \Delta t$$

where $H_i$ is the average water depth of a measurement segment i, m is the total number of the segments in the transect, $\Delta t$ is the averaging interval for the segments, k is the unit vector in the vertical direction, and V is the depth-averaged water velocity vector of the segment i (hereafter, the subscript i may be omitted for simplicity):

$$V = \frac{1}{H} \int_0^H u \cdot dz \qquad (6)$$

where H is determined by:

H=Transducers' depth+Average of depths measured by three transducers (7)

The cross-product for each of the segments, in the x-y coordinate, is written as:

$$(V \times V_b) \cdot k = V_x V_{by} - V_y V_{bx} \quad (8)$$

where subscripts x and y stand for components in the x and y direction, respectively. Note that the cross-product is coordinate independent. Thus x-y can be any fixed coordinate or earth coordinate. Discharge is then calculated from:

$$Q = \sum_{i=1}^{m} [V_x V_{by} - V_y V_{bx}]_i H_i \Delta t \quad (9)$$

For each segment, the system 100, 500 measures the water velocities at a number of depth cells in the water column. The depth of the first cell is denoted as $D_f$:

$$D_f = \text{Transducers' depth} + \text{blanking distance} + \text{cell size } D_c \quad (10)$$

The depth of the last good (or valid) cell is denoted as $D_l$:

$$D_l = D_f + n D_c \quad (11)$$

where n is the total number of the good cells in the segment. n is determined by:

$$n = \frac{\text{Measured Transducer Height} \times 0.9 - \text{Blanking Distance}}{\text{Cell Size } D_c} \quad (12)$$

A factor of 0.9 is used in the equation because 10% of the profiling range to the bottom may be contaminated by the echo through the side lobe for the transducer beams that are at 25 degree from the vertical. In other embodiments, other factors may be selected.

Let $Z_1$ be the distance from the river bottom to the last good cell and $Z_2$ the distance to the first cell:

$$Z_1 = H - D_l - \frac{1}{2} D_c \quad (13)$$

$$Z_2 = H - D_f + \frac{1}{2} D_c \quad (14)$$

Then, the x component of the depth-averaged velocity of the segment, $V_x$, is written as (similar to $V_y$):

$$V_x = \frac{1}{H} \int_0^H u_x \cdot dz \quad (15)$$

$$= \frac{1}{H} \left[ \int_0^{Z_1} u_x dz + \int_{Z_1}^{Z_2} u_x dz + \int_{Z_2}^H u_x dz \right]$$

$$= \frac{1}{H} [Z_1 V_{xB} + (Z_2 - Z_1) V_{xM} + (H - Z_2) V_{xT}]$$

where $V_{xT}$, $V_{xM}$, and $V_{xB}$ are the average velocities of the top, middle, and bottom water layers.

Middle Layer Velocity and Discharge

The middle layer average velocity of a segment is the average of the measured velocities of all the good depth cells in the segment. The x component of the middle layer velocity vector (similar for the y component) is written as follows:

$$V_{xM} = \frac{1}{n} \sum_{j=1}^{n} u_{xj} \quad (16)$$

where $u_{xj}$ is the velocity measured at a depth cell j. Accordingly, the discharge in the middle layer is calculated by:

$$Q_M = \sum_{i=1}^{m} [(V_{xM} V_{by} - V_{yM} V_{bx})]_i \cdot (Z_2 - Z_1)_i \Delta t \quad (17)$$

Estimate of Velocities and Discharge Near the Water Surface and Bottom

The top area 420 velocity and discharge is not measured by the system 100, 500 due to the mounting depth of the housing 108 and the blanking distance of the transducers 104. Similarly, the bottom area 422 velocity and discharge are not measured due to the primary side lobe 304, 604 or the inference of the profile beams 302, 602 with the bottom 410.

The method of computing the velocities in the top area 420 and bottom area 422 is typically known as velocity profile extrapolation. The system 100, 500 employs either the power law method or constant method to estimate the average velocity near the water surface (top layer) and that near the river bottom (bottom layer). The default method is the power law method. However, the user can select the constant method during the playback. Each method is explained below.

In another embodiment, the power law or constant methods can be applied to the discharge in the transect portion to extrapolate the discharge in the top area 420 and bottom area 422.

Power Law Method

The power law velocity profile proposed by Chen (1991) is written as:

$$\frac{u}{u*} = 9.5 \left( \frac{z}{z_0} \right)^b \quad (18)$$

where u is the velocity at a height z measured from the river bottom, u* is the bottom shear velocity, $z_0$ is the bottom roughness height, and b is a constant (equal to ⅙ according to Chen 1991). It is easy to show that the velocity components in a x-y coordinate also follow the power law. For the x component of the velocity:

$$u_x = a_x z^b \quad (19)$$

where $a_x = (9.5 u*_x / z_0 b)$. $a_x$ can be obtained by the integration of the above equation in the middle layer in a segment:

$$\int_{Z_1}^{Z_2} u_x dz = \int_{Z_1}^{Z_2} a_x z^b dz \quad (20)$$

$$= a_x \frac{(Z_2^{b+1} - Z_1^{b+1})}{b+1}$$

$$= \frac{(Z_2 - Z_1)}{n} \sum_{j=1}^{n} u_{xj}$$

$$= D_c \sum_{j=1}^{n} u_{xj}$$

Rearranging to solve $a_x$ yields:

$$a_x = \frac{D_c (b+1)}{Z_2^{b+1} - Z_1^{b+1}} \sum_{j=1}^{n} u_{xj} \quad (21)$$

A similar result can be obtained for $a_y$. Then the top layer velocity of the segment is estimated as follows:

$$V_{xT} = \frac{D_c(H^{b+1} - Z_2^{b+1})}{(H - Z_2)(Z_2^{b+1} - Z_1^{b+1})} \sum_{j=1}^{n} u_{xj} \quad (22)$$

Similarly, the bottom layer velocity of the segment is obtained as:

$$V_{xB} = \frac{D_c Z_1^{b+1}}{Z_1(Z_2^{b+1} - Z_1^{b+1})} \sum_{j=1}^{n} u_{xj} \quad (23)$$

In addition, the x-component of the depth-averaged velocity of the segment is written as (similar for the y component):

$$V_x = \left[ \frac{Z_1^{b+1}}{(Z_2^{b+1} - Z_1^{b+1})} + 1 + \frac{(H^{b+1} - Z_2^{b+1})}{(Z_2^{b+1} - Z_1^{b+1})} \right] \frac{D_c}{H} \sum_{j=1}^{n} u_{xj} \quad (24)$$

Constant Method

The constant method assumes the top-layer velocity is a constant and equal to the velocity measured at the first depth cell. For the x component of the velocities:

$$V_{xT} = V_{x,first} \quad (25)$$

Similarly, the bottom layer velocity is equal to the velocity measured at the last good depth cell:

$$V_{xB} = V_{x,last} \quad (26)$$

Thus, the depth-averaged velocity with constant top and bottom layer velocities is written as:

$$V_x = \frac{Z_1}{H} V_{x,last} + \frac{D_c}{H} \sum_{j=1}^{n} u_{xj} + \frac{(H - Z_2)}{H} V_{x,first} \quad (27)$$

Similar results can be obtained for the y components of the velocities.

The constant method does not follow the accepted hydraulic description of velocity profile in open channels, particularly in the bottom layer where the velocity decreases to zero at the bottom 410. Therefore, constant method may not be as accurate as the power law method.

Top/Bottom Layer Discharges

The top-layer discharge is estimated from the following:

$$Q_T = \sum_{i=1}^{m} [(V_{xT} V_{by} - V_{yT} V_{bx})]_i \cdot (H - Z_2)_i \Delta t \quad (28)$$

The bottom-layer discharge is estimated as:

$$Q_B = \sum_{i=1}^{m} [(V_{xB} V_{by} - V_{yB} V_{bx})]_i \cdot (Z_1)_i \Delta t \quad (29)$$

Estimate of Near Shore Discharges

Figure 12:
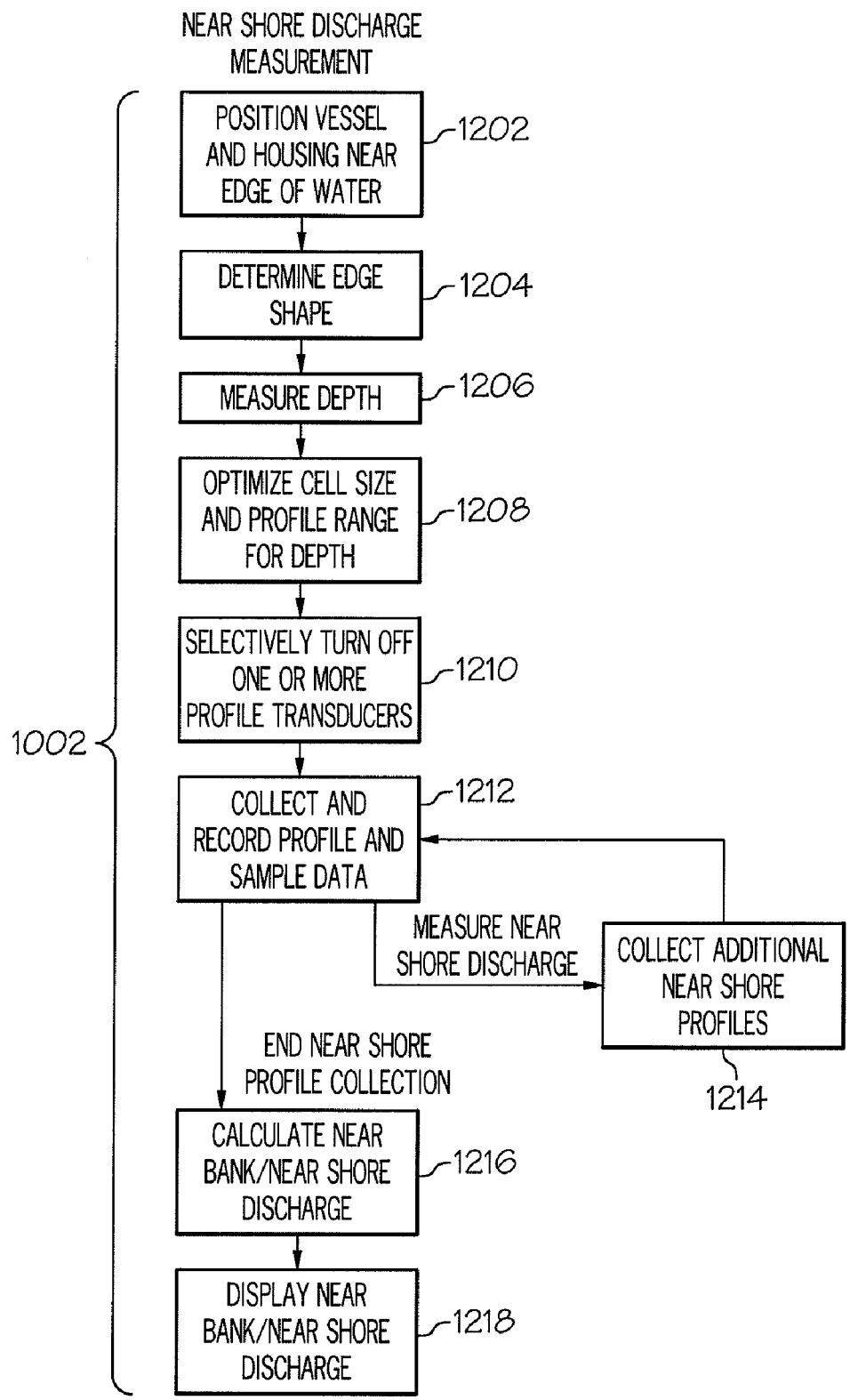
FIG. 12 is a flowchart of a near shore discharge measurement method in one embodiment of the integrated multi-beam acoustic Doppler discharge measurement system and method.

Referring now to FIG. 12, to perform the near shore discharge measurement 1002, the vessel 108 and housing 110 are positioned 1202 near the edge of the body of water and the vessel remains stationary. The user determines 1204 the shape of the edge, or near shore area 424, to be used in the calculations by selecting either a triangle or a rectangle shape or estimating the near shore area 424 discharge using the graphical user interface 1302. The 5-beam transducer system 100 or 9-beam transducer system 500 measures 1206 the depth of the body of water. The system 100, 500 then optimizes 1208 the cell size and profile range to the depth measurement. The system 100, 500 selectively turns off 1210 one or more transducers 104 if their primary side lobe 304, 604 interferes with the measurements taken using the profile beam 300, or if the profile beam 300 interferes with the measurements of another transducer 104. The system 100, 500 collects, records 1212 the profile and sample data. The profile and sample data is recorded to the data store 904. The system 100, 500 also collects additional near shore profile 1214 to create a more average reading for the near shore area 424. The system 100, 500 then calculates 1216 and displays 1218 the near shore area 424 discharge.

Triangular Shape

A ratio-interpolation method is recommended by USGS to determine the discharge for a triangular shape near-bank area (Simpson and Oltmann, 1993). The equation for the near-bank discharge estimate is as follows:

$$Q_{NB} = 0.707 L \frac{d_m}{2} V_m \quad (30)$$

where $Q_{NB}$ is the near-bank discharge, L is the distance from the bank to the start or end point of the measurements, $d_m$ is the depth of the first or last measurement segment, and $V_m$ is the depth-averaged velocity of the first or last measurement segment. L is estimated by a user during the field measurement.

Rectangular Shape

Laboratory data suggested that the depth-averaged velocity in the vicinity of a smooth side-wall of a rectangular channel can be related to the depth-averaged velocity at a distance from the wall equal to the water depth of the channel. The USGS (Rantz et. al. 1982) presented the data that define the relation. These data are shown in Table 3.

TABLE 3

Laboratory Data for Velocity Near Side-Wall of Open Channel

| Distance from wall, as a ratio of the depth: $s/d_0$ | Velocity ratio (data) $V_s/V_0$ | Velocity ratio (empirical) $V_s/V_0$ |
|---|---|---|
| 0.00 | 0.65 | 0.65 |
| 0.25 | 0.90 | 0.8712 |
| 0.50 | 0.95 | 0.9526 |
| 1.00 | 1.00 | 0.9936 |

An empirical expression was developed to fit the velocity data. It is written as:

$$\frac{V_s}{V_0} = 1 - 0.35 e^{-4\frac{s}{d_0}} \quad (31)$$

where $V_s$ is the velocity at a distance of s from the side-wall, $V_d$ is the velocity at a distance from the wall equal to the water depth of the channel, and $d_0$ is the water depth of the channel. The estimated values of the velocity ratios using Eq. (31) are also shown in the above Table 3.

Assuming Eq. (31) applies to the near shore area in a river and $d_0=d_m$. $V_0$ can be determined by substituting $s=L$ and $V_s=V_m$ into Eq. (31):

$$V_0 = \frac{V_m}{\left[1 - 0.35e^{-4\frac{L}{d_m}}\right]} \tag{32}$$

The near-bank discharge is estimated from the following:

$$Q_{NB} = \int_0^L V_s d_m dx \tag{33}$$

Substitute Eq. (31) into Eq. (33), results in the following:

$$Q_{NB} = d_m L V_m \frac{1 - \frac{0.35}{4}\frac{d_m}{L}\left(1 - e^{-4\frac{L}{d_m}}\right)}{1 - 0.35e^{-4\frac{L}{d_m}}} \tag{34}$$

Electronics Systems

In one embodiment, the 5-beam transducer system 100 and 9-beam transducer system 500 further comprise an embedded electronics package 900 in the housing 108 adapted to calculate the flow of water across a cross-section of a body of water. In alternate embodiments, the electronics package is external to the 5-beam transducer system 100 and 9-beam transducer system 500 and outside the housing 108.

Figure 9A:
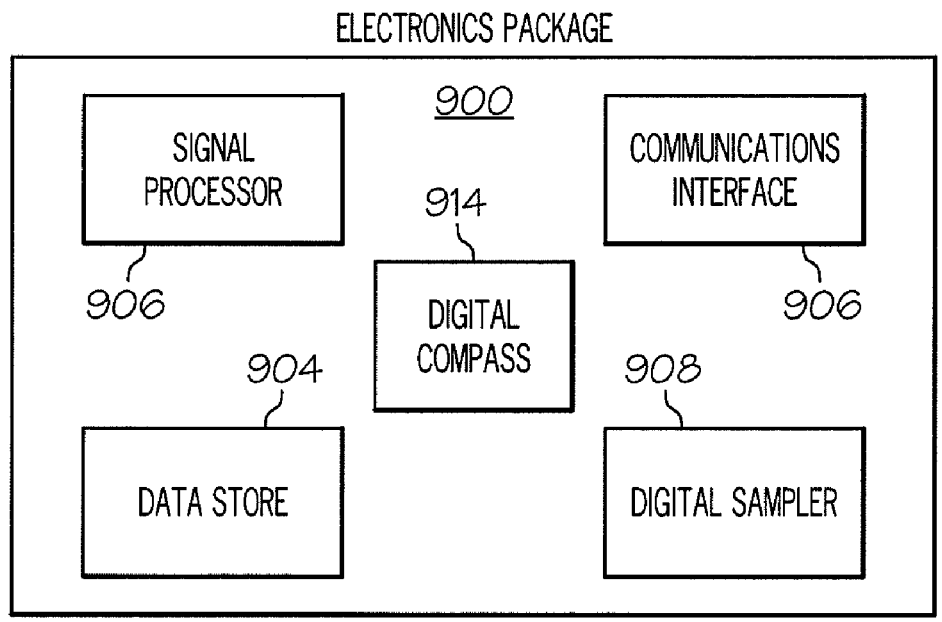
FIGS. 9a and 9b are block diagrams of an electronics package and a power communications module, respectively, in one embodiment of the integrated multi-beam acoustic Doppler discharge measurement system and method.

Referring now to FIG. 9a, in one embodiment, the electronics package 900 comprises a signal processor 902, a data store 904, a communications interface 906, a digital compass 914, and a digital sampler 908. In various embodiments, the signal processor 902 is an ARM processor, a RISC processor, a microprocessor, a digital signal processor, or any other processor capable of calculating the flow of water across a cross-section of a river from the digitally sampled transducer measurements. In various embodiments, the data store 904 is RAM, EEPROM, Flash Memory, and any other volatile or non-volatile memory. In various embodiments, the communications interface 906 is a serial connection, a parallel connection, a 1394 connection, a USB connection, an Ethernet connection, a wired connection, a radio link, a wireless communications interface, a Bluetooth communications interface, a 802.11x communications interface, a WiFi communications interface, a mobile phone interface, or any other communications interface or device capable of receiving or transmitting data to or from the electronics package 900. The digital compass 914 provides heading, pitch and roll information.

In an embodiment, the electronics package 900 further comprises a digital sampler 908 for converting the analog measurements from the transducers 102, 104 into digital samples. In another embodiment, the signal processor 902 converts the analog measurements from the transducers 102, 104 into digital samples. In another embodiment, the measurements from the transducers 102, 104 are digital.

Figure 9B:
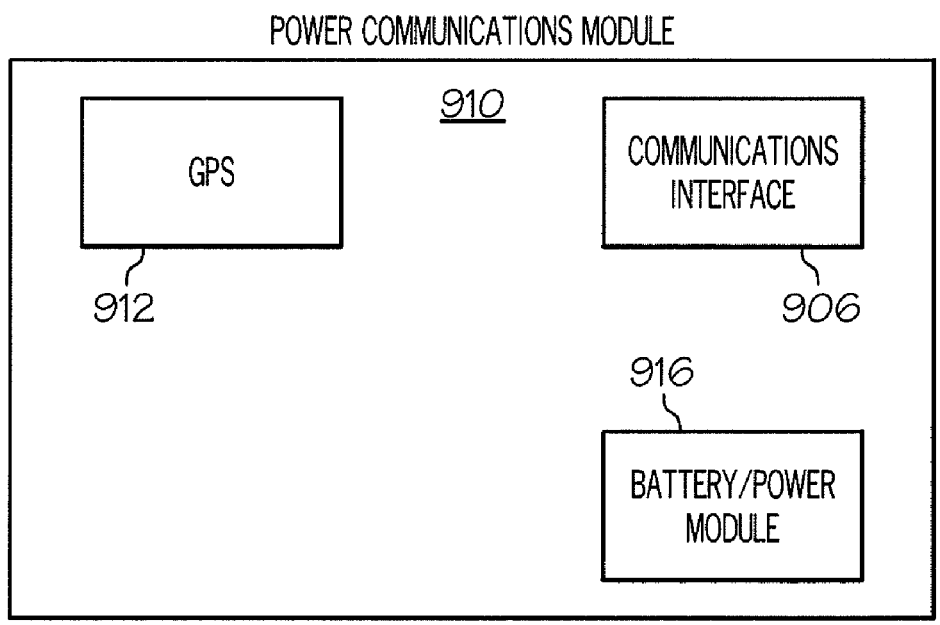

Referring now to FIG. 9b, in one embodiment, a power communications module 910 comprises a GPS 912, a battery or power module 916, and a communications interface 906. A power and signal assembly 106 (not shown) would be used to connect the power communications module 910 to the electronics package 900. In this embodiment, the electronics package 900 obtains power and transmits data with the power communications module 910 through the power and signal assembly 106. In another embodiment, the electronics package 900 has a local battery and does not use a power and signal assembly 106, but rather communicates wireless via the communications interfaces 906.

Generally, while the housing 108 is mounted under water, the power communications module 910 is mounted on the vessel 110 in a dry area. The electronic package 900 communicates with the GPS 912 on the vessel 110 via the communications interface 906. In one embodiment this is performed wirelessly. In another embodiment, the communication takes place over the power and signal assembly 106.

The signal processor 902 performs the discharge calculations to determine the flow of water across a cross-section of a river or body of water. In one embodiment, the electronics package 900 records digitally sampled measurements from the transducers, 102, 104 to the data store 904. In another embodiment, the signal processor 902 records the values for cells 406 to the data store 904. In another embodiment, the signal processor 902 records the processed transect.

In one embodiment, a user with a PC or mobile device controls the electronics package 900. In another embodiment the electronic package 900 operates autonomously without requiring constant control by a user. For example, the electronic package 900 can perform measurements across a transect of a body of water semi-autonomously, and then the data later retrieved by the user from the data store 904. By storing the data in the data store 904, data is not lost if the electronic package 900 loses communications with a user, as may happen if the body of water is sufficiently large. Allowing a PC or mobile device to connect to and disconnect from the electronic package 900 permits greater data collection flexibility. Further, the communications loss or drop-outs do not affect data collection. Without this functionality, data collection during transects would be susceptible to communications loss, and communications losses or drops-outs would force a user to have to repeat a transect. In most cases, it is not practical to repeat only a portion of a transect as it is difficult to precisely line up portions of older transects with a new transect, and therefore the user would have to repeat the entire transect.

Another advantage of performing the discharge measurements in the electronic package 900 is that it improves interoperability with various external computer platforms and operating systems. Generally, most communications interfaces 906 use standardized communication protocols, for example TCP/IP. In one embodiment, discharge measurements are performed in the electronic package 900. In another embodiment, data from the data store is communicated to an external computer platform and discharge measurements are performed in the external computer platform. This cross-platform capability allows the system software to be tested in both in the electronic package 900 and in an external computer platform.

Graphical User Interface

Referring now to FIGS. 13a, 13b, 13c, 13d, 14a, 14b, 15, and 16, in one embodiment, the graphical user interface 1302 is presented to the user on a external computer platform or mobile computing platform. In one embodiment the graphical user interface is created in the electronics package 900. The another embodiment, the graphical user interface is created in separate software running on the external computer platform or mobile computing platform.

Figure 13A:
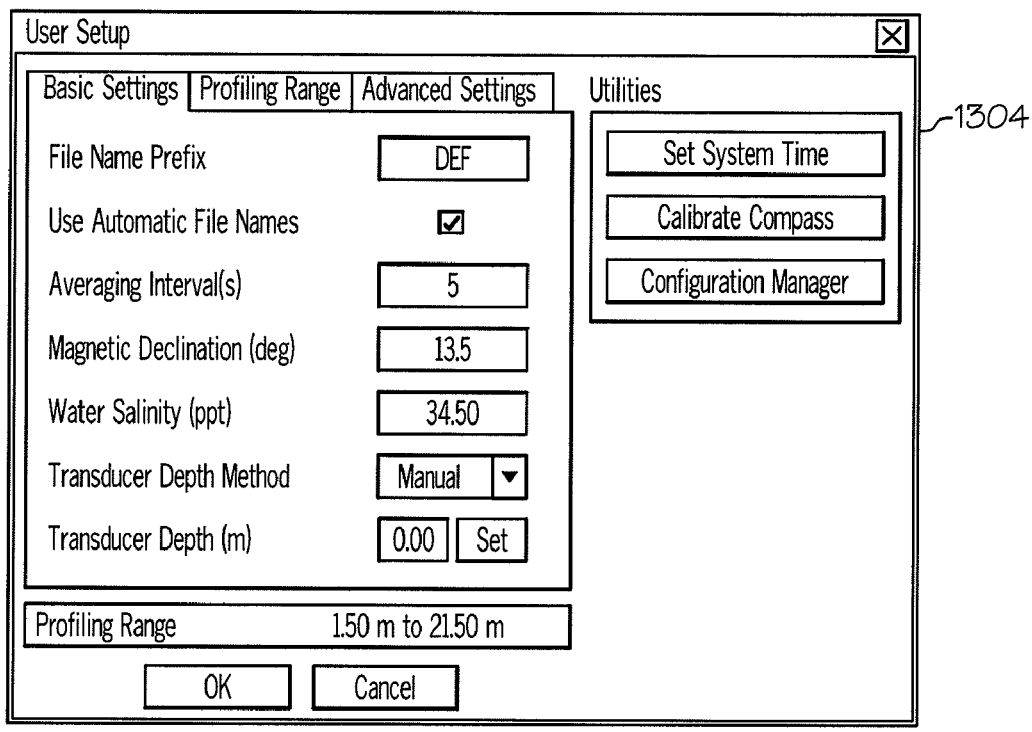

Referring now to FIG. 13a, an exemplary screenshot of the basic user setup configuration screen 1304 permits a user to manually enter information for naming the profiles stored in the data store 904, the sampling interval, offsets to the digital compass due to magnetic disturbances, water salinity, and the transducer draft distance.

Figure 13B:
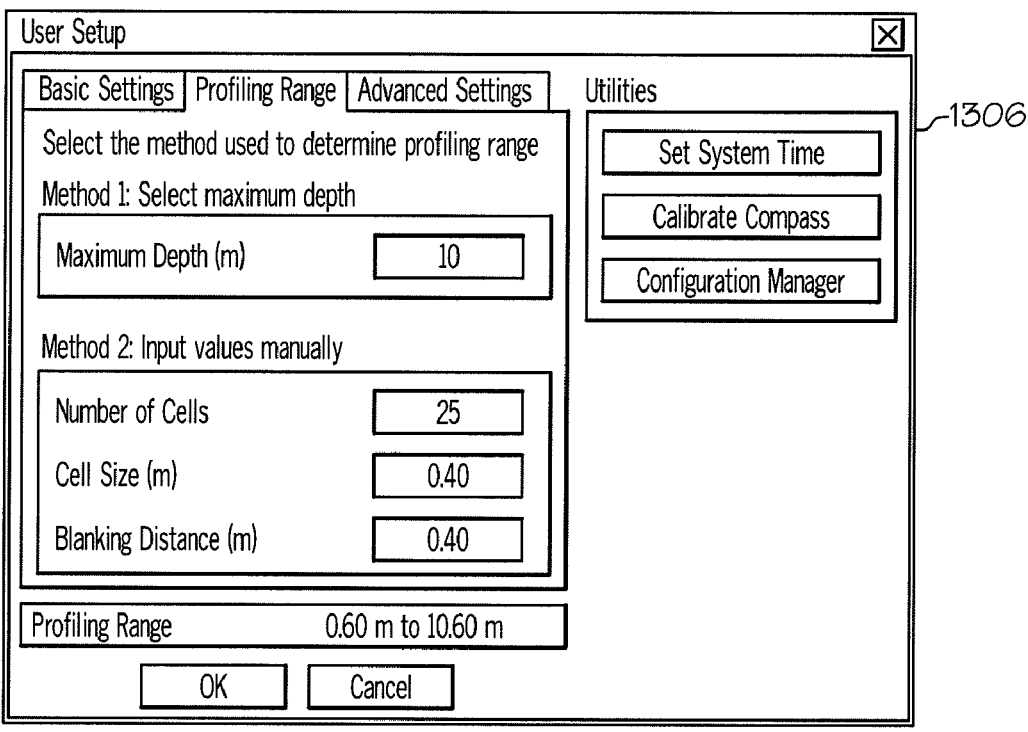

Referring now to FIG. 13b, an exemplary screenshot of the profiling range setup configuration screen 1306 permits a user to manually enter information for selecting the maximum depth for sampling, the number of cells in each profile, the cell size and the transducer blanking distance.

Figure 13C:
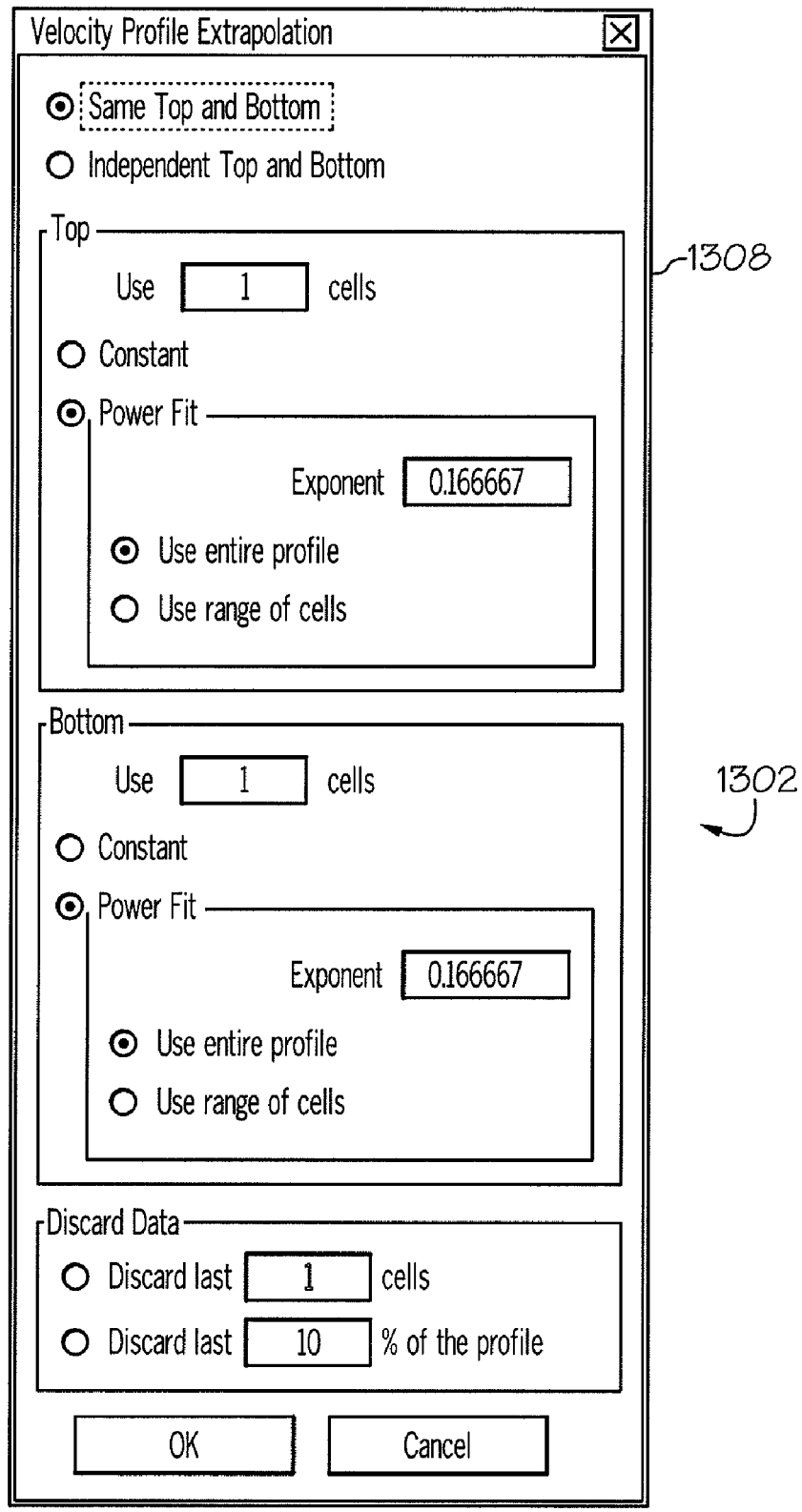

Referring now to FIG. 13c, an exemplary screenshot of the velocity profile extrapolation setup configuration screen 1308 permits a user to manually enter information for calculating the unmeasured top area 420 and the unmeasured bottom area 422.

Referring now to FIG. 13d, an exemplary screenshot of the unmeasured discharge calculation screen 1310 permits a user to manually enter information for calculating the unmeasured near shore areas 424 and displays the calculated and measured discharges.

Referring now to FIG. 14a, an exemplary screenshot of the discharge measurement summary screen 1402 presents a summary of a set of measurement sessions relating to measurements made from a particular cross-section of a body of water. Referring now to FIG. 14b, an exemplary screenshot of a customizable discharge measurement summary report 1404 presents a more detailed information about the particular cross-section of the body of water.

Figure 15:
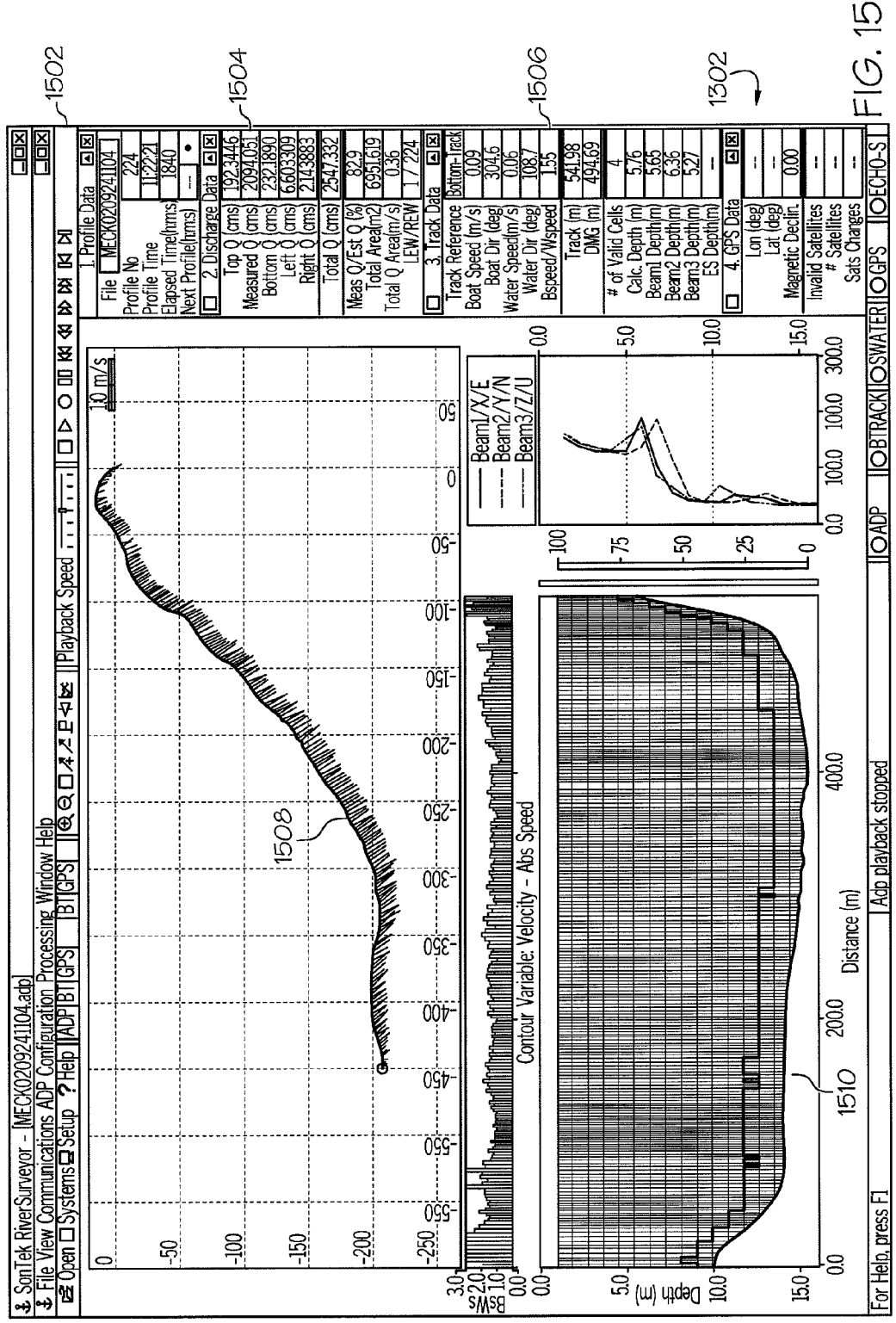
FIG. 15 is a real time graphical discharge display for an exemplary software graphical user interface in one embodiment of the integrated multi-beam acoustic Doppler discharge measurement system and method.

Referring now to FIG. 15, an exemplary screenshot of the real time velocity display 1502 presents the user with a graphical representation of the measurements made during a track by the 5-beam transducer system 100 or 9-beam transducer system 500 across a particular cross-section of a body of water. The real time velocity display 1502 present real time transect measurements from the measured cells 416, and estimates from the unmeasured cross-sectional areas 418 total river discharge in a river discharge window 1504. In a track window 1506, numeric information about the vessel 110, depth, vertical beam 200 and profile beams 300 is presented. In the track graphical windows 1508, a graphical representations of the velocity of the water in the cells 406 is displayed on top of a path of the vessel 110 movement. In the contour graphical window 1510, a graphical representation of the cross-section including the variation of parameters for each of the set of measured cells 416 and the depth of the bottom 410 of the body of water is presented. The real time velocity display 1502 can be displayed in real time from data measurements as they are being measured and transmitted by the 5-beam transducer system 100 or 9-beam transducer system 500, or the graphical representations and numerical data can be played back from a data stored in the data store 904 or a file that was previously downloaded to the external computing platform.

Figure 16:
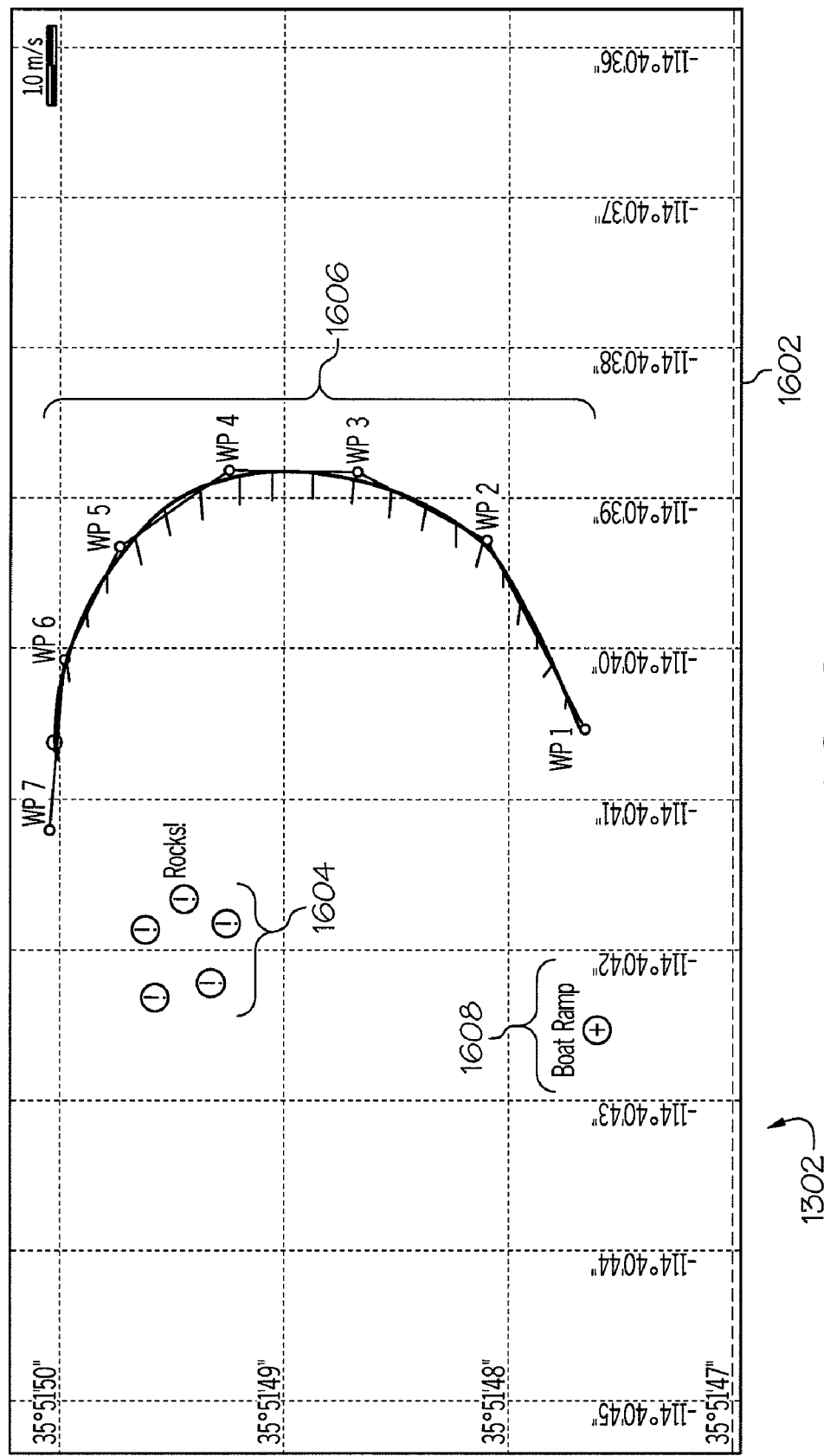
FIG. 16 is a track display for an exemplary software graphical user interface in one embodiment of the integrated multi-beam acoustic Doppler discharge measurement system and method.

Referring now to FIG. 16, an exemplary screenshot of the river track 1602 presents the user with a graphical representation track taken by the vessel 110 having a 5-beam transducer system 100 or a 9-beam transducer system 500 across a particular cross-section of a body of water. The river track 1602 allows the user to define and show hazards 1604 that are to be avoided by the vessel. The river track 1602 also shows points of interest 1608, such as the boat ramp, which facilitates guiding a vessel 110 back to the point of interest 1608, for example when it is dark, when visibility is limited, or when guiding a semi-autonomous remote vessel 110. The river track 1602 allows the user to define specific waypoints 1606 that assist in guiding the vessel 110 along a repeatable route during the track. The river track 1602 assists the user in creating a track across a cross-section of a body of water that can be reliably repeated during multiple tracks on the same day or multiple tracks over a period of time, for example months or years. Using the river track 1602, a user can build a library of stored data about the particular body of water for comparison with future tracks. In one embodiment, the library of stored data is stored in the data store 904. In another embodiment, the river track 1602 will display GIS (Geographic Information System) data such as maps or aerial photographs.

The embodiments of the invention shown in the drawings and described above are exemplary of numerous embodiments that may be made within the scope of the appended claims. It is contemplated that numerous other configurations of a burst optimized tracking algorithm may be created taking advantage of the disclosed approach. It is the applicant's intention that the scope of the patent issuing herefrom will be limited only by the scope of the appended claims.

What is claimed is:

1. An apparatus for determining the flow of water across a cross-section of a body of water, comprising:
   a housing;
   a depth transducer mounted in said housing and directed substantially vertically towards a bottom of the body of water; and
   a plurality of profile transducers mounted in said housing proximate to said depth transducer, said plurality of profile transducers directed downward at an angle relative to said depth transducer, said plurality of profile transducers facing different directions, and
   wherein said profile transducers produce an acoustic signal having a profile beam of a profile frequency and wherein a Doppler frequency shift corresponding to the velocity of a volume of water relative to the transducer is derived from a returned profile echo from said volume of water,
   wherein said depth transducer produces an acoustic signal of a depth frequency lower than said profile frequency with a depth beam wider than said profile beam, and wherein a depth corresponding to the distance between said depth transducer and said bottom of the body of water is derived from a returned depth echo from said bottom of the body of water, and
   wherein at least a portion of said depth beam is coincident with a measured volume of water of the cross-section of the body of water.

2. The apparatus of claim 1, wherein said profile frequency and shape of said profile beam are selected to provide a plurality of spatially accurate returned profile echoes from distinct volumes of water along a column of water.

3. The apparatus of claim 2, wherein said profile frequency is selected from the range of approximately 100 KHz to approximately 5 MHz.

4. The apparatus of claim 1, wherein said profile beam has a reduced primary side lobe.

5. The apparatus of claim 1, wherein said depth frequency and shape of said depth beam are selected to provide a returned depth echo that correlates to a distance to said bottom of the body of water, and wherein measurement of said distance remains substantially unaffected when said housing is angularly displaced through an angle proportional to a beam width of said depth beam.

6. The apparatus of claim 5, wherein said depth frequency is selected from the range of approximately 100 KHz to approximately 5 MHz.

7. The apparatus of claim 1, further comprising:
   a signal processor operably adapted to derive the flow of water across the cross section of the body of water using a plurality of said returned profile echoes from said profile transducers and a velocity measurement of said housing relative to said bottom of the body of water.

8. The apparatus of claim 7, wherein said profile transducers produce a depth acoustic signal of said profile frequency, and wherein said signal processor derives said velocity measurement of said housing and a second depth measurement from a returned depth echo from said bottom of the body of water at said profile frequency.

9. The apparatus of claim 7, further comprising a GPS device, and wherein said velocity measurement of said housing is derived from a data from said GPS device.

10. The apparatus of claim 7, further comprising a compass and inertial measurement unit to determine orientation of said housing.

11. The apparatus of claim 7, further comprising a temperature sensor in said housing.

12. The apparatus of claim 7, wherein said signal processor processes said returned profile echo from said volume of water into a value and adds said value to a cell, said cell corresponding to said volume of water, and said value representing an instantaneous measured velocity of water in said volume of water, said returned profile echo being a time segmented portion of a total returned profile echo and corresponding to said volume of water, said volume of water is a portion of a column of water between a first depth and a second depth, said column of water is coincident with said depth beam and divided by depths into a plurality of volumes.

13. The apparatus of claim 12, wherein said value of said cell is stored in an electronic package.

14. The apparatus of claim 12, wherein said acoustic signal comprises a pulse coherent signal and a non-pulse coherent signal, and said returned profile echo comprises a returned echo from said pulse coherent signal and a returned echo from said non-pulse coherent signal.

15. The apparatus of claim 12, wherein said signal processor uses said depth to dynamically determine depths at which to divide said column of water into said plurality of volumes.

16. The apparatus of claim 7, further comprising an electronics package communicatively connected to said profile transducers, and wherein said operation to derive said flow of water and an operation to calculate a discharge measurement is performed internally in said electronics package.

17. The apparatus of claim 1, wherein at least one of said plurality of profile transducers is turned off as said housing approaches a shore of said body of water.

18. The apparatus of claim 1, wherein one of said plurality of profile transducers is turned off to prevent a backscatter from a lobe of said profile beam from interfering with a measurement by another of said plurality of profile transducers.

19. The apparatus of claim 1, further comprising:
a plurality of high resolution profile transducers mounted in said housing proximate to said depth transducer and said plurality of profile transducers, said plurality of high resolution profile transducers directed downward at an angle relative to said depth transducer, said plurality of high resolution profile transducers facing different directions, and
wherein said high resolution profile transducer produces an acoustic signal of a high resolution profile frequency higher than said profile frequency.

20. The apparatus of claim 19, wherein a high resolution profile transducer is selectively turned off and a profile transducer is selectively turned on when said depth of the body of water exceeds an effective depth of said high resolution profile transducer.

21. The apparatus of claim 19, wherein a high resolution profile transducer is selectively turned off and a profile transducer is selectively turned on when a particulate in the body of water interferes with a measurement by said high resolution transducer.

22. The apparatus of claim 19, wherein a high resolution transducer and a profile transducer are both turned on, said high resolution transducer providing a high resolution velocity measurement of a water volume within an effective depth of said high resolution transducers, and said profile transducer providing a velocity measurement at a water volume within an effective depth of said profile transducer.

23. The apparatus of claim 19, wherein a high resolution transducer is turned on and a profile transducer is turned off, said high resolution transducer providing a high resolution velocity measurement of a water volume in a shallow water.

24. The apparatus of claim 23, wherein said shallow water is a flood plain.

25. A method of determining the flow of water across a cross-section of a body of water, comprising:
transmitting a depth acoustic impulse from a depth transducer at a depth frequency in a substantially downward vertical direction in the body of water;
receiving a returned depth echo from said depth acoustic impulse;
processing said returned depth echo to determine a depth of the body of water;
transmitting a profile acoustic impulse from a plurality of profile transducers at a profile frequency at an acute angle relative to said vertical direction and an angle relative to each other profile transducer;
receiving at each profile transducer a returned profile echo from said profile acoustic impulse, said returned profile echoes having a Doppler frequency shift corresponding to the velocity of a volume of water; and
processing said returned profile echoes into a velocity measurement of a measured volume of water, said measured volume of water being centered spatially and aligned axially with said depth acoustic impulse.

26. The method of claim 25, further comprising:
turning off a profile transducer of said plurality of profile transducers in response to an indicia of error in said velocity measurement.

27. The method of claim 26, wherein said indicia of error is selected from the group consisting of a depth measurement and an increase in SNR in said returned profile echo compared to a comparable returned profile echo.

28. The method of claim 25, further comprising:
processing a plurality of said returned profile echoes to determine said depth of the body of water.

29. The method of claim 28, further comprising:
correlating said depth determined by said processing said plurality of returned profile echoes with said depth determined by said processing said returned depth echo to provide validation of said depth and an estimation of error.

30. The method of claim 25, further comprising:
processing a plurality of said returned profile echoes to determine a velocity and a direction of said plurality of profile transducers relative to a bottom of the body of water.

31. The method of claim 30, further comprising:
correlating said velocity and said direction of said profile transducers with said velocity measurement of said volume of water to produce a corrected velocity of said measured volume of water.

32. The method of claim 31, wherein said velocity and said direction of said profile transducers is determined utilized a compass and an inertial measurement unit.

33. The method of claim 32, further utilizing a GPS to determine said velocity and said direction of said profile transducers.

34. The method of claim 25, further comprising:
processing said returned profile echo into a plurality of time segmented portions of said volume of water, each of said plurality of time segmented portions corresponding to a cell defining a portion of a column of water between a first depth and a second depth, and having a width proportional to the time between two transmitted profile impulses, and said cell containing a computed velocity measurement derived from a plurality of said volumes of water.

35. The method of claim 34, further comprising:
dynamically adjusting a range and resolution of said returned profile echo processed into said plurality of time segmented portions based at least in part upon said depth of the body of water.

36. The method of claim 25, further comprising:
transmitting a high frequency acoustic impulse from a plurality of high frequency profile transducers at a higher frequency than said profile frequency, at an acute angle relative to said vertical direction, and at an angle relative to each other high frequency profile transducer;
receiving at each high frequency transducer a returned high frequency profile echo from said high frequency acoustic impulse, said returned high frequency profile echoes having a Doppler frequency shift; and
processing said returned high frequency profile echoes into a velocity measurement of a second measured volume of water, said second measured volume of water being centered spatially and aligned axially with said depth acoustic impulse.

37. The method of claim 36, further comprising:
turning off said plurality of profile transducers in response to a shallow body of water having a depth less than or equal to an effective operating depth of said high frequency profile transducers.

38. The method of claim 37, wherein said shallow water is a flood plain.

39. The method of claim 36, further comprising:
turning off said plurality of high frequency profile transducers in response to a deep body of water having a depth greater than an effective operating depth of said high frequency profile transducers.

40. The method of claim 36, further comprising:
processing said returned high frequency profile echo into a plurality of high frequency time segmented portions of said volume of water, each of said plurality of high frequency time segmented portions corresponding to a high frequency cell defining a portion of a column of water between a first depth and a second depth, and having a width proportional to the time between two transmitted profile impulses, and said cell containing a computed high frequency velocity measurement derived from a plurality of said volumes of water.

41. The method of claim 40, further comprising:
correlating said computed velocity measurement with said computed high frequency velocity measurement to provide a validation of said computed velocity measurement and an estimation of error.

* * * * *